(12) United States Patent
Tsai et al.

(10) Patent No.: US 10,681,742 B2
(45) Date of Patent: Jun. 9, 2020

(54) METHOD AND APPARATUS FOR RANDOM ACCESS IN A WIRELESS COMMUNICATION SYSTEM

(71) Applicant: ASUSTek Computer Inc., Taipei (TW)

(72) Inventors: Hsin-Hsi Tsai, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 66 days.

(21) Appl. No.: 15/650,315

(22) Filed: Jul. 14, 2017

(65) Prior Publication Data

US 2018/0020487 A1 Jan. 18, 2018

Related U.S. Application Data

(60) Provisional application No. 62/363,535, filed on Jul. 18, 2016.

(51) Int. Cl.
*H04W 74/08* (2009.01)
*H04B 7/06* (2006.01)
*H04B 7/0404* (2017.01)
*H04W 72/04* (2009.01)
*H04W 74/00* (2009.01)
(Continued)

(52) U.S. Cl.
CPC ...... *H04W 74/0841* (2013.01); *H04B 7/0404* (2013.01); *H04B 7/0608* (2013.01); *H04B 7/0695* (2013.01); *H04W 72/0446* (2013.01); *H04W 74/004* (2013.01); *H04W 74/0833* (2013.01); *H04W 48/08* (2013.01); *H04W 76/10* (2018.02); *H04W 92/20* (2013.01)

(58) Field of Classification Search
CPC ......... H04W 74/0841; H04W 74/0833; H04W 74/004; H04W 72/0446; H04W 76/10; H04W 92/20; H04W 48/08; H04B 7/0695
See application file for complete search history.

(56) References Cited

U.S. PATENT DOCUMENTS

| 10,009,929 | B1 * | 6/2018 | Zhou | H04W 52/48 |
| 2012/0320874 | A1 * | 12/2012 | Li | H04W 48/12 370/331 |

(Continued)

FOREIGN PATENT DOCUMENTS

| WO | 2015085466 | 6/2015 |
| WO | 2016086144 | 6/2016 |
| WO | 2016127392 | 8/2016 |

OTHER PUBLICATIONS

Office Action from Taiwan intellectual Property Office in corresponding TW Application No. 106123722, dated Jun. 8, 2018.

(Continued)

*Primary Examiner* — Ivan O Latorre
(74) *Attorney, Agent, or Firm* — Blue Capital Law Firm, P.C.

(57) ABSTRACT

Methods and apparatuses for random access in a wireless communication system are disclosed herein. In one method, a user equipment (UE) performs a first attempt of a random access procedure to communicate with a cell via at least a first UE beam. The UE performs a second attempt of the random access procedure to communicate with the cell via at least a second UE beam when the first attempt fails, in which the direction of the first UE beam and the direction of the second UE beam are different.

20 Claims, 27 Drawing Sheets

(51) Int. Cl.
*H04W 76/10* (2018.01)
*H04W 48/08* (2009.01)
*H04W 92/20* (2009.01)

(56) References Cited

U.S. PATENT DOCUMENTS

| | | | |
|---|---|---|---|
| 2013/0265866 A1 | 10/2013 | Yi | |
| 2014/0016573 A1 | 1/2014 | Nuggehalli et al. | |
| 2014/0376466 A1* | 12/2014 | Jeong | H04W 74/0833 370/329 |
| 2016/0043792 A1 | 2/2016 | Jeong et al. | |
| 2016/0066197 A1* | 3/2016 | Park | H04W 16/28 370/329 |
| 2016/0330766 A1 | 11/2016 | Liu | |
| 2017/0026962 A1* | 1/2017 | Liu | H04W 52/10 |
| 2017/0251460 A1* | 8/2017 | Agiwal | H04W 72/0406 |
| 2017/0346534 A1* | 11/2017 | Islam | H04W 52/04 |

OTHER PUBLICATIONS

Samsung: "Random Access Procedure in NR", 3GPP Draft; R2-163372_RANDOM Access Procedure in NR, 3rd Generation Partnership Project (3GPP), Mobile Competence Centre ; 650, Route Des Lucioles ; F-06921 Sophia-Antipolis Cedex ;France; vol. RAN WG2, No. Nanjing, China; May 23, 2016-May 27, 2016;May 22, 2016 (May 22, 2016), XP051104903, Retrieved from the Internet: URL: http://www.3gpp.org/ftp/Meetings_3GPP_Synciranz/Docs/.
European Search Report from corresponding EP Application No. 17181357.9, dated Nov. 15, 2017.
Office Action from the Korean Intellectual Property Office in the corresponding Korean Application No. 10-2017-0089683, dated Apr. 17, 2018.
Office Action from Japan Patent Office in corresponding JP Application No. 2017-137502, dated Sep. 11, 2018.

\* cited by examiner

Different deployment scenarios with Single TRP cell

METHOD AND APPARATUS FOR RANDOM ACCESS IN A WIRELESS COMMUNICATION SYSTEM

CROSS-REFERENCE TO RELATED APPLICATIONS

The present Application claims the benefit of U.S. Provisional Patent Application Ser. No. 62/363,535 filed on Jul. 18, 2016, the entire disclosure of which is incorporated herein in its entirety by reference.

FIELD

This disclosure generally relates to wireless communication networks, and more particularly, to a method and apparatus for random access in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for random access in a wireless communication system are disclosed herein. In one method, a user equipment (UE) performs a first attempt of a random access procedure to communicate with a cell via at least a first UE beam. The UE performs a second attempt of the random access procedure to communicate with the cell via at least a second UE beam when the first attempt fails, in which the direction of the first UE beam and the direction of the second UE beam are different.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, NR (New Radio) access technology, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, Beam Forming Impact; R2-163716, Discussion on terminology of beamforming based high frequency NR; R2-162709, Beam support in NR; R2-162762, Active Mode Mobility in NR: SINR drops in higher frequencies; R3-160947, TR 38.801 V0.1.0, Study on New Radio Access Technology; Radio Access Architecture and Interfaces; R2-164306, Summary of email discussion [93bis#23][NR] Deployment scenarios; RAN2#94 meeting minutes; R2-163879, RAN2 Impacts in HF-NR; R2-162210, Beam level management <–> Cell level mobility; R2-163471, Cell concept in NR; R2-164270, General considerations on LTE-NR tight interworking; TS 36.300; R2-162251, RAN2 aspects of high frequency New RAT; and TS 36.321, MAC specification. The standards and documents listed above are hereby expressly incorporated by reference in their entirety.

Figure 1:
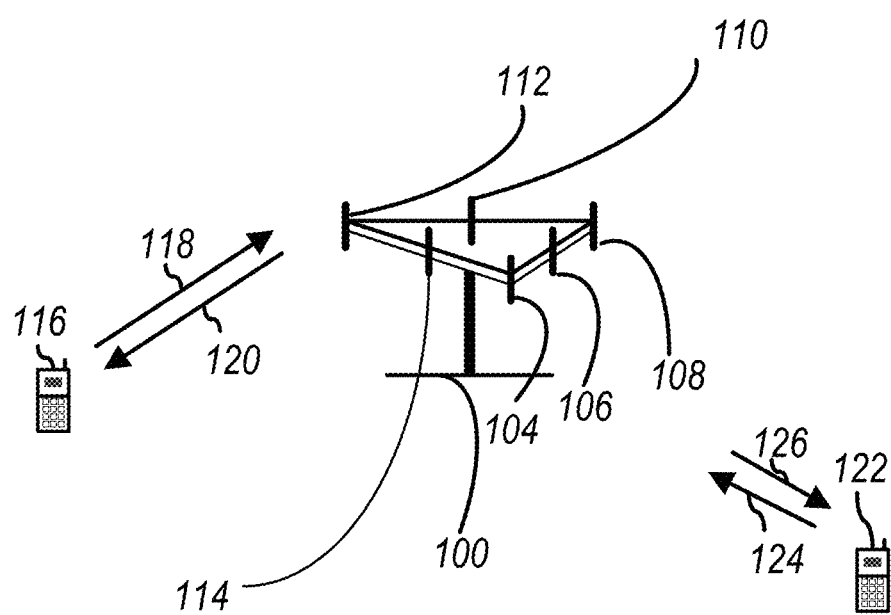
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a Frequency Division Duplex (FDD) system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
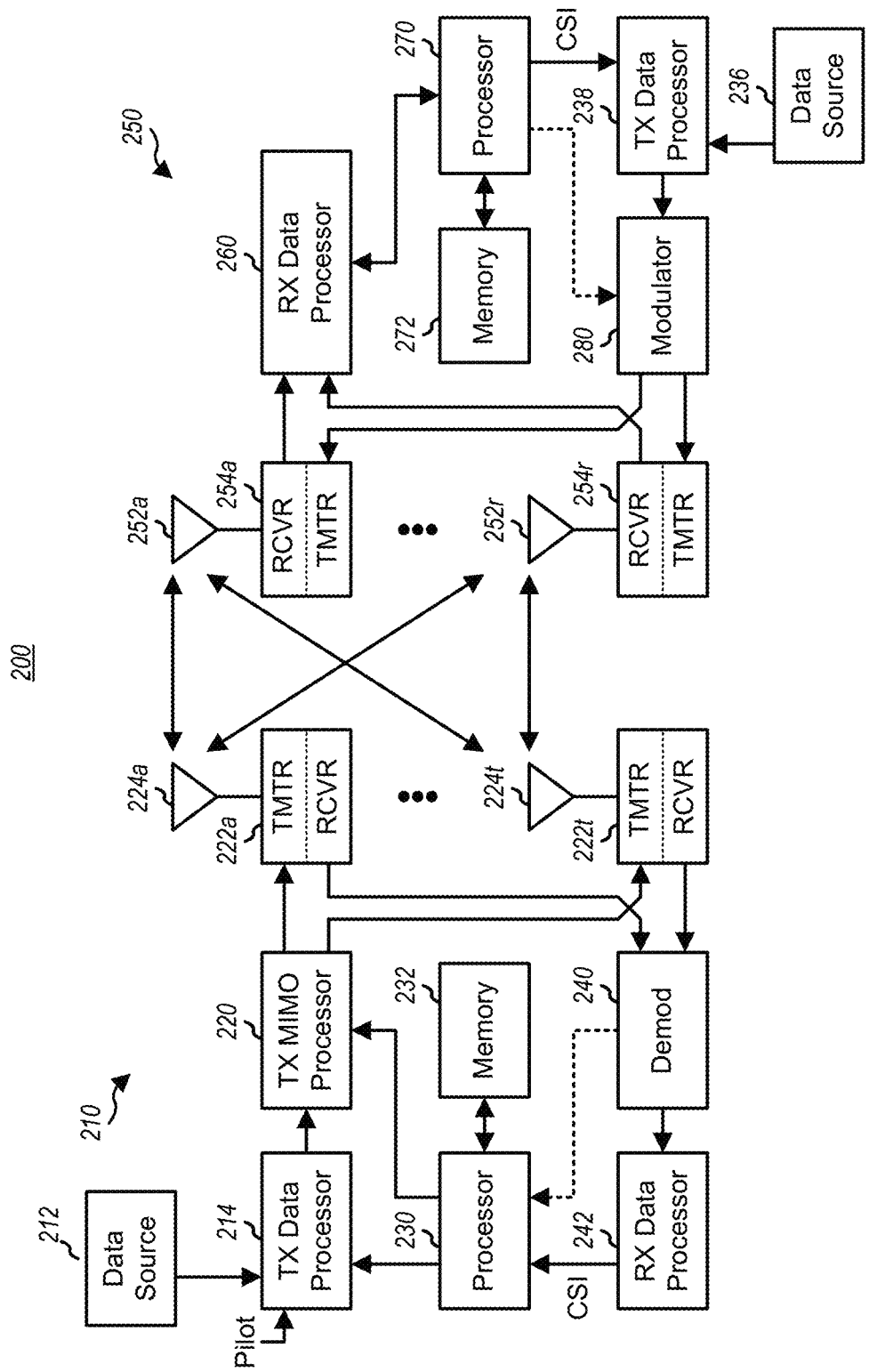
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a Multiple Input Multiple Output (MIMO) system 200. At the transmitter system 210, traffic data for a number of data streams is provided from a data source 212 to a transmit (TX) data processor 214.

In one embodiment, each data stream is transmitted over a respective transmit antenna. Transmission (TX) data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
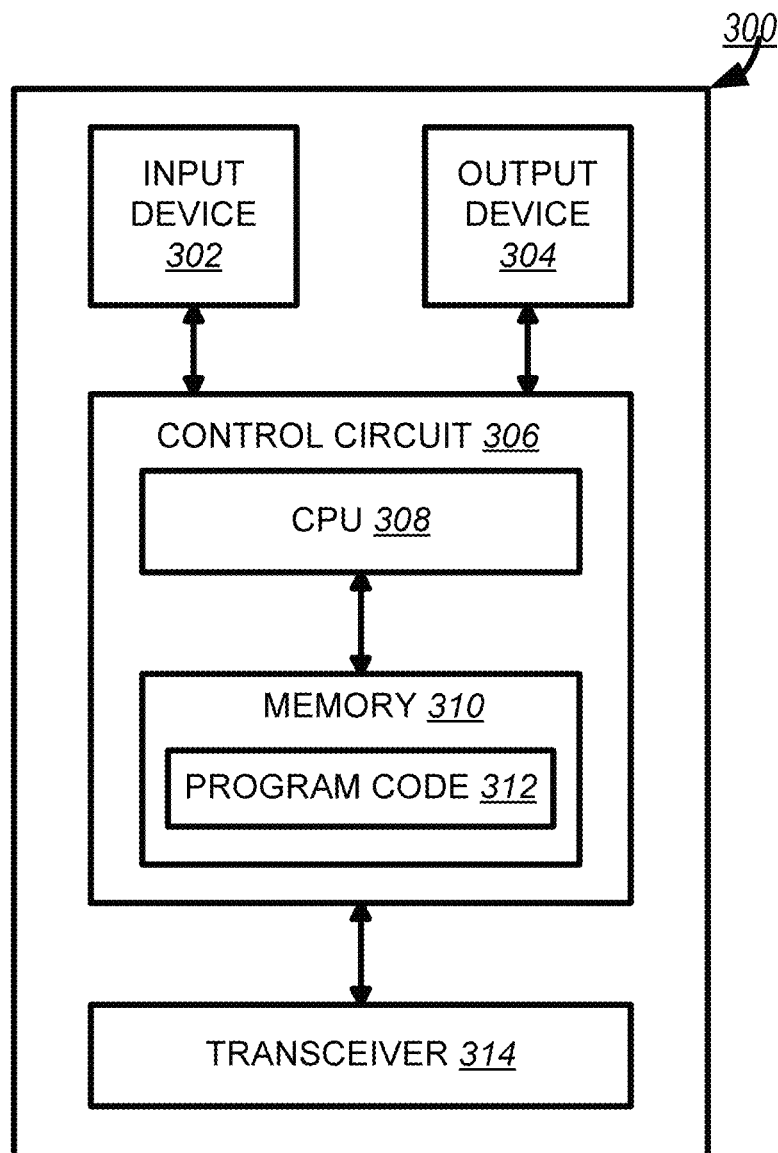
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
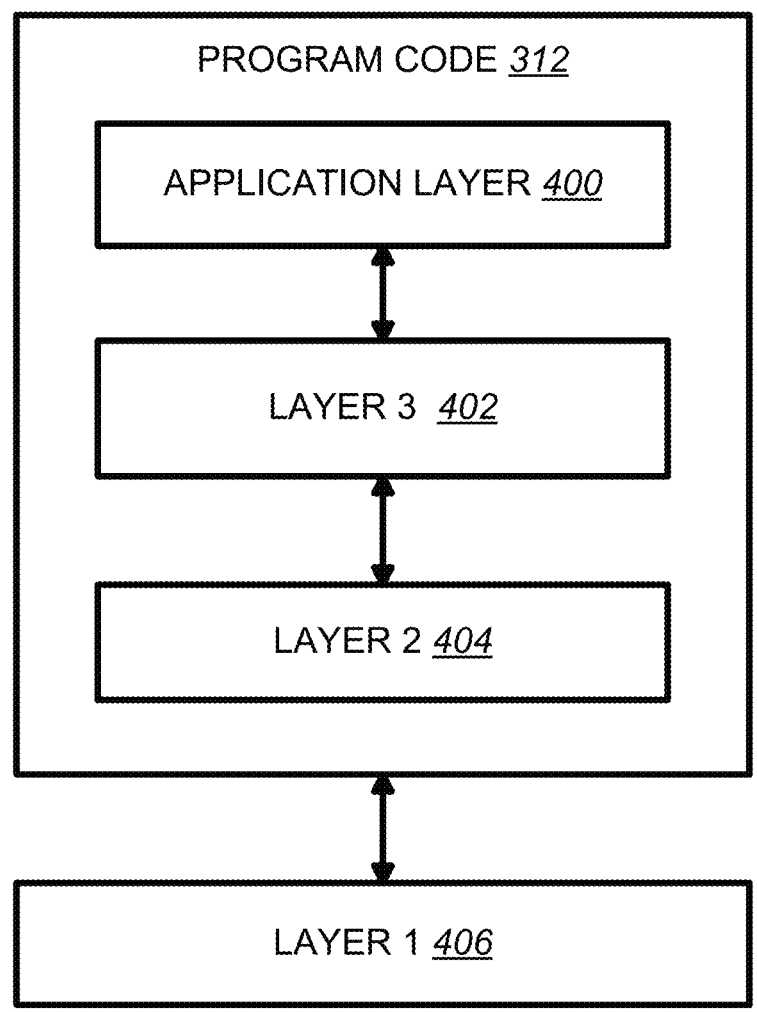
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020: eMBB (enhanced Mobile Broadband); mMTC (massive Machine Type Communications); and URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g. current LTE bands <6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5:
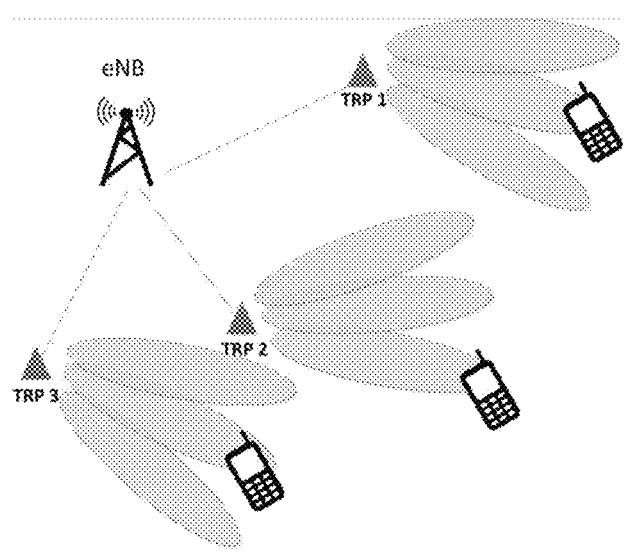
FIG. 5 illustrates one beam concept in 5G.

Based on 3GPP R2-162709 and as shown in FIG. 5, an eNB may have multiple TRPs (either centralized or distributed). Each TRP can form multiple beams. The number of beams and the number of simultaneous beams in the time/frequency domain depend on the number of antenna array elements and the radio frequency (RF) at the TRP. Potential mobility type for New RAT (NR) can be intra-TRP mobility, inter-TRP mobility, and inter-NR eNB mobility.

Based on 3GPP R2-162762, reliability of a system purely relying on beamforming and operating in higher frequencies might be challenging, since the coverage might be more sensitive to both time and space variations. As a consequence of that the SINR (Signal to Interference plus Noise Ratio) of that narrow link can drop much quicker than in the case of LTE.

Using antenna arrays at access nodes with the number of elements in the hundreds, a fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 6:
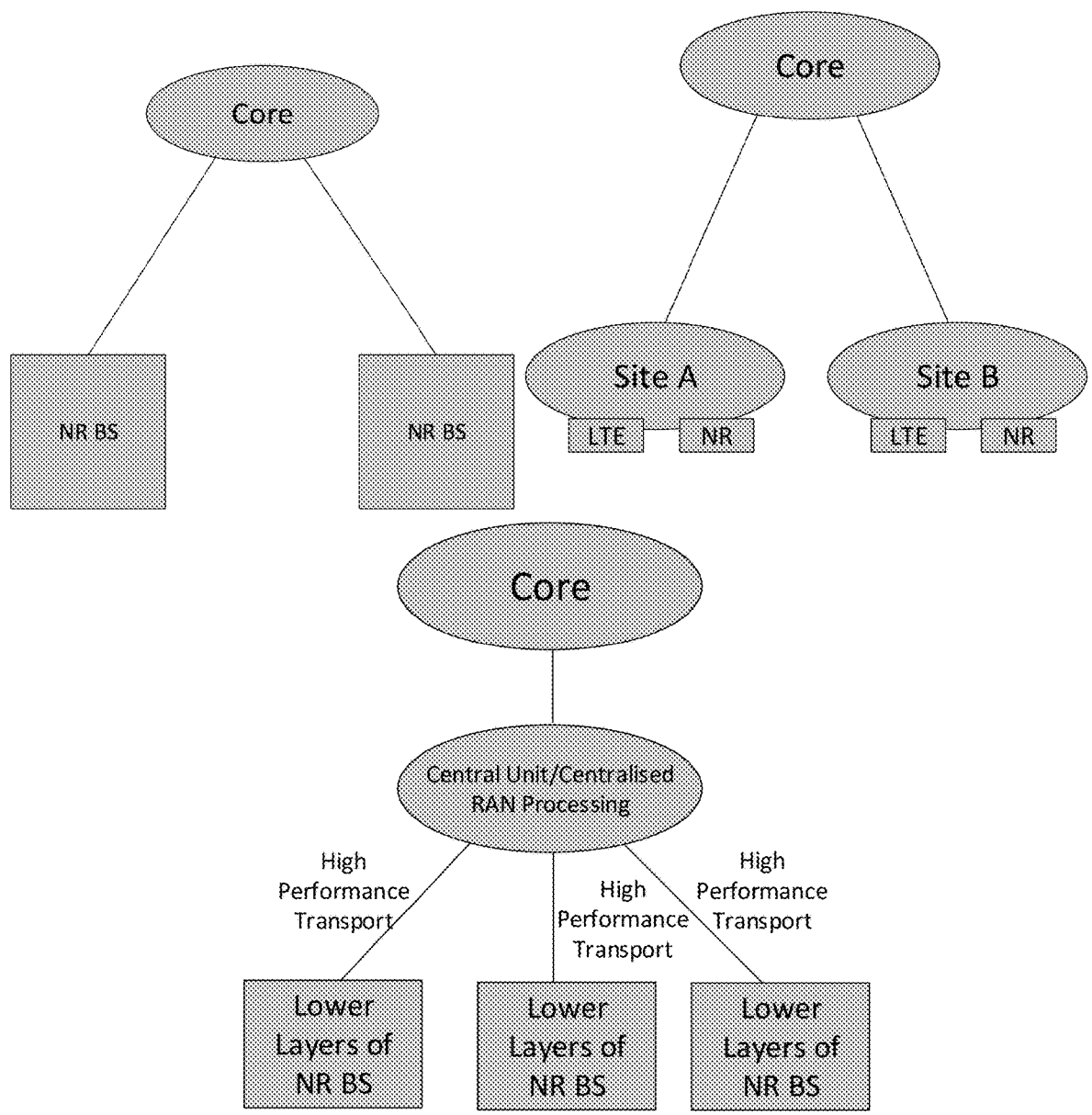
FIG. 6 illustrates stand-alone, co-sited with LTE, and centralized base
Figure 7:
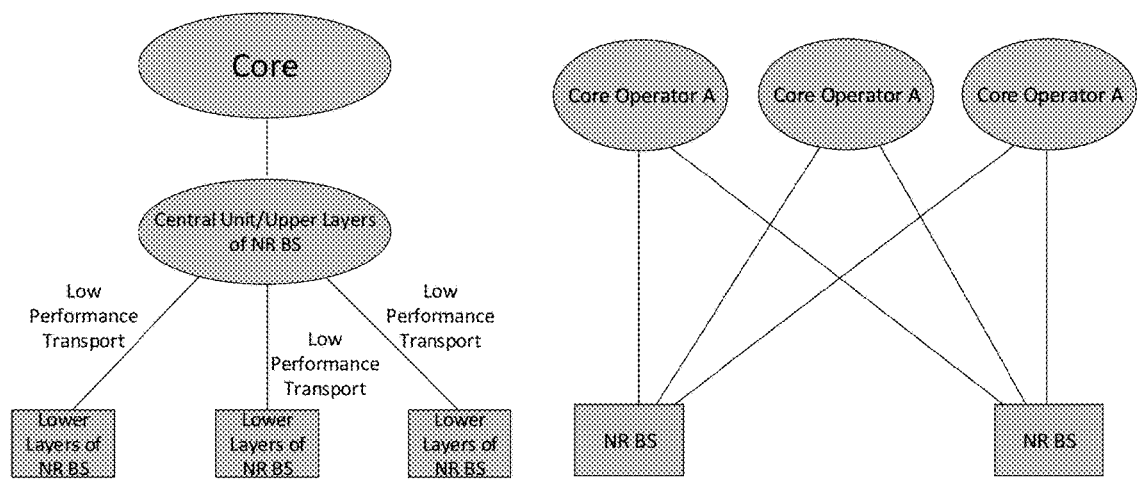
FIG. 7 illustrates centralized with lower performance transport and Shared RAN.

Based on 3GPP R3-160947, the scenarios illustrated in FIG. 6 and FIG. 7 should be considered for support by the NR radio network architecture.

Based on 3GPP R2-164306, the following scenarios in terms of cell layout for standalone NR are captured to be studied: macro cell only deployment, heterogeneous deployment, and small cell only deployment.

Based on 3GPP RAN2#94 meeting minutes, one NR eNB corresponds to one or more Transmission/Reception Points (TRPs). And there are two levels of network controlled mobility: Radio Resource Control (RRC) driven at the "cell" level and zero/minimum RRC involvement (e.g., at Medium Access Control (MAC)/Physical (PHY)).

Based on 3GPP R2-162210, in 5G, the principle of 2-level mobility handling may possibly be kept at cell level mobility (i.e., cell selection/reselection in IDLE, handover in Connected State (CONN) or handled by RRC in CONN state) or beam level management (i.e., L1 handles appropriate selection of the TRP to use for a UE and the optimal beam direction).

5G systems are expected to rely more heavily on "beam based mobility" to handle UE mobility, in addition to regular handover based UE mobility. Technologies like Multiple Input Multiple Output (MIMO), fronthauling, Cloud RAN (C-RAN) and Network Function Virtualization (NFV) will allow the coverage area controlled by one "5G Node" to grow, thus increasing the possibilities for beam level management and reducing the need for cell level mobility. All mobility within the coverage area of one 5G node could in theory be handled based on beam level management, which would leave handovers only to be used for mobility to the coverage area of another 5G Node.

Figure 8:
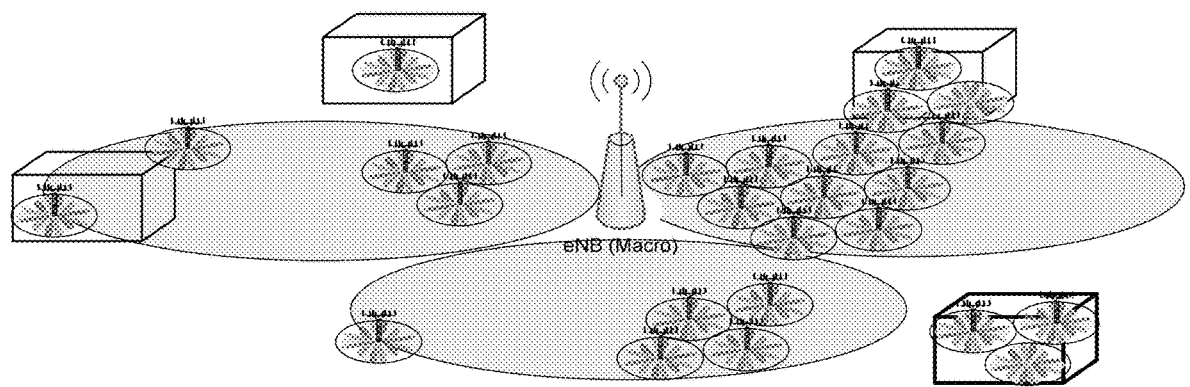
FIG. 8 illustrates different deployment scenarios with a single transmission/reception point (TRP) cell.
Figure 9:
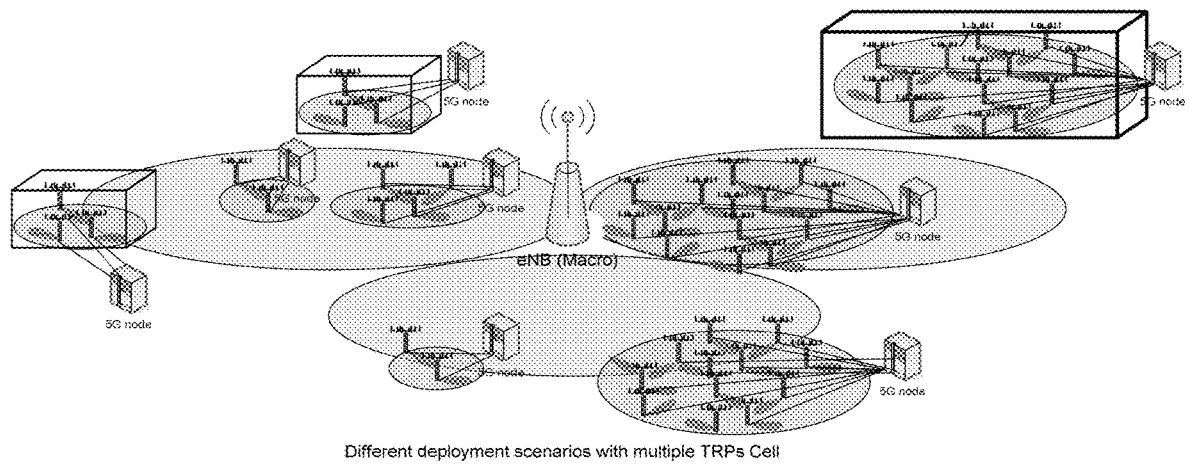
FIG. 9 illustrates different deployment scenarios with multiple TRP cells.
Figure 10:
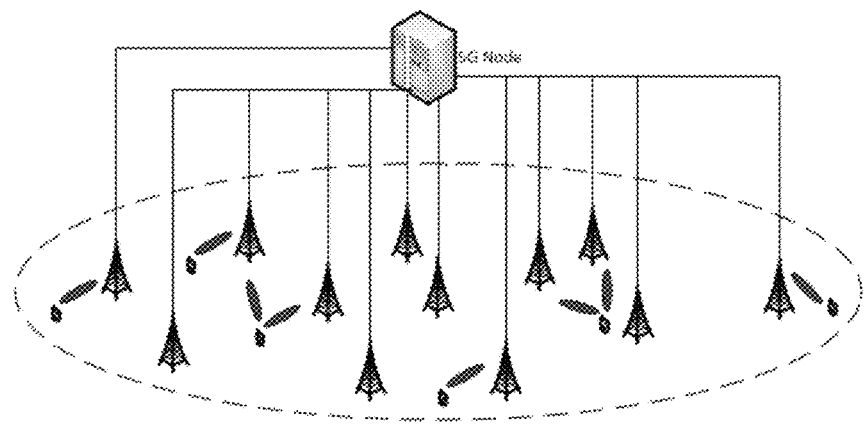
FIG. 10 illustrates a 5G cell having a 5G node with multiple TRPs.
Figure 11:
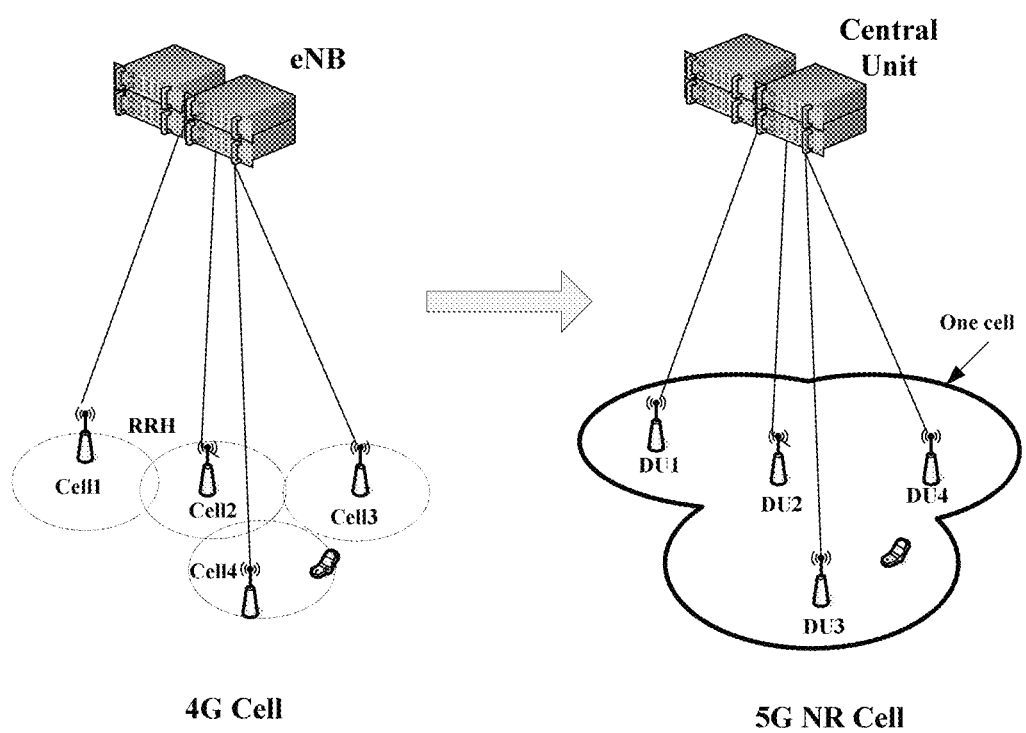
FIG. 11 illustrates a comparison between a LTE cell and a NR cell.

FIGS. 8-11 show some examples of the concept of a cell in 5G NR. FIG. 8 shows different deployment scenarios with single TRP cell. FIG. 9 shows different deployment scenarios with multiple TRP cells. FIG. 10 shows one 5G cell comprising a 5G node with multiple TRPs. FIG. 11 shows a comparison between a LTE cell and a NR cell.

Based on 3GPP TS 36.300, the random access procedure is performed for the following events related to the Primary Cell (PCell):
  Initial access from RRC_IDLE;
  RRC Connection Re-establishment procedure;
  Handover;
  DL data arrival during RRC_CONNECTED requiring random access procedure:
    E.g. when Uplink (UL) synchronization status is "non-synchronized".
  UL data arrival during RRC_CONNECTED requiring random access procedure:
    E.g. when UL synchronisation status is "non-synchronised" or there are no Physical Uplink Control Channel (PUCCH) resources for Scheduling Request (SR) available.
  For positioning purpose during RRC_CONNECTED requiring random access procedure;
    E.g. when timing advance is needed for UE positioning.

The random access procedure is also performed on a Secondary Cell (SCell) to establish time alignment for the corresponding Secondary Timing Advance Group (sTAG).

Furthermore, the random access procedure takes two distinct forms:
  Contention based (applicable to first five events);
  Non-contention based (applicable to only handover, Downlink (DL) data arrival, positioning and obtaining timing advance alignment for a sTAG).

Normal DL/UL transmission can take place after the random access procedure.

In LTE two types of Random Access (RA) procedure are defined: contention-based and contention-free (Non-contention based).

Figure 12:
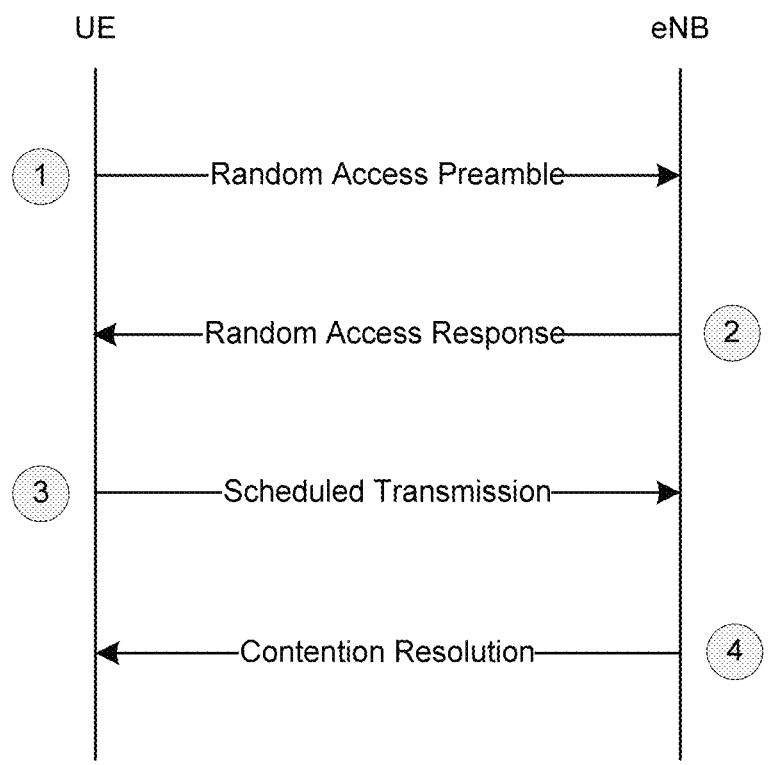
FIG. 12 illustrates a contention based random access procedure.

Contention based random access procedure is illustrated in FIG. 12.

The four steps of the contention based random access procedures are:
  1) Random Access Preamble on Random Access Channel (RACH) in uplink (Message (Msg) 1):
    There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.
  2) Random Access Response generated by Medium Access Control (MAC) on Downlink Shared Channel (DL-SCH) (Msg2):
    Semi-synchronous (within a flexible window of which the size is one or more Transmission Time Interval (TTI)) with message 1;
    No Hybrid Automatic Repeat Request (HARQ);
    Addressed to Random Access-Radio Network Temporary Identifier (RA-RNTI) on Physical Downlink Control Channel (PDCCH);
    Conveys at least RA-preamble identifier, Timing Alignment information for the pTAG, initial UL grant and assignment of Temporary C-RNTI (which may or may not be made permanent upon Contention Resolution);
    Intended for a variable number of UEs in one Downlink Shared Channel (DL-SCH) message.
  3) First scheduled UL transmission on Uplink Shared Channel (UL-SCH) (Msg3):
    Uses HARQ;
    Size of the transport blocks depends on the UL grant conveyed in step 2.
    For initial access:
      Conveys the Radio Resource Control (RRC) Connection Request generated by the RRC layer and transmitted via Common Control Channel (CCCH);
      Conveys at least Non-Access Stratum (NAS) UE identifier but no NAS message;
      Radio Link Control (RLC) Transparent Mode (TM): no segmentation.
    For RRC Connection Re-establishment procedure:
      Conveys the RRC Connection Re-establishment Request generated by the RRC layer and transmitted via CCCH;
      RLC TM: no segmentation;
      Does not contain any NAS message.
    After handover, in the target cell:
      Conveys the ciphered and integrity protected RRC Handover Confirm generated by the RRC layer and transmitted via DCCH (Dedicated Control Channel);
      Conveys the Cell Radio Network Temporary Identifier (C-RNTI) of the UE (which was allocated via the Handover Command);
      Includes an uplink Buffer Status Report when possible.
    For other events:
      Conveys at least the C-RNTI of the UE.
  4) Contention Resolution on DL (Msg4):
    Early contention resolution shall be used i.e. eNB does not wait for NAS reply before resolving contention;
    Not synchronized with message 3;
    HARQ is supported;
    Addressed to:
      The Temporary C-RNTI on PDCCH for initial access and after radio link failure;
      The C-RNTI on PDCCH for UE in RRC_CONNECTED.
    HARQ feedback is transmitted only by the UE which detects its own UE identity, as provided in message 3, echoed in the Contention Resolution message;
    For initial access and RRC Connection Re-establishment procedure, no segmentation is used (RLC-TM).

The Temporary C-RNTI is promoted to C-RNTI for a UE which detects Random Access (RA) success and does not already have a C-RNTI; it is dropped by others. A UE which detects RA success and already has a C-RNTI, resumes using its C-RNTI.

Figure 13:
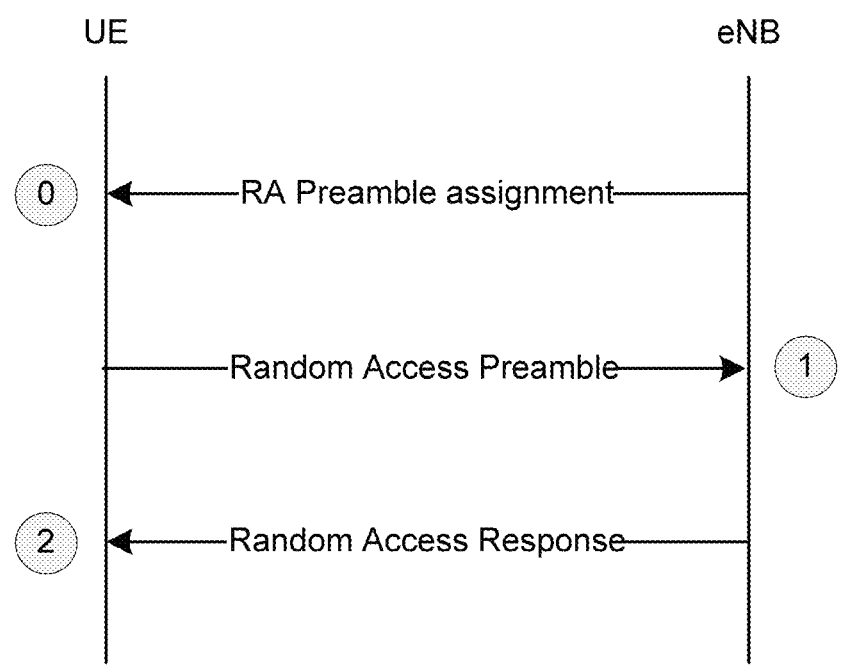
FIG. 13 illustrates a non-contention based random access procedure.

Non-contention based (Contention free) random access procedure is illustrated in FIG. 13.

The three steps of the non-contention based random access procedures are:

1) Random Access Preamble assignment via dedicated signalling in DL (Msg0):
   eNB assigns to UE a non-contention Random Access Preamble (a Random Access Preamble not within the set sent in broadcast signalling).
   Signalled via:
      HO (Handover) command generated by target eNB and sent via source eNB for handover;
      PDCCH in case of DL data arrival or positioning;
      PDCCH for initial UL time alignment for a sTAG.
2) Random Access Preamble on Random Access Channel (RACH) in uplink (Msg1):
   UE transmits the assigned non-contention Random Access Preamble.
3) Random Access Response on DL-SCH (Msg2):
   Semi-synchronous (within a flexible window of which the size is two or more Transmission Time Intervals (TTIs)) with message 1;
   No HARQ;
   Addressed to RA-RNTI on PDCCH;
   Conveys at least:
      Timing Alignment information and initial UL grant for handover;
      Timing Alignment information for DL data arrival;
      RA-preamble identifier;
      Intended for one or multiple UEs in one DL-SCH message.

The following terminology and assumption may be used hereafter.

Base Station (BS): a network central unit in NR which is used to control one or multiple TRPs which are associated with one or multiple cells. Communication between BS and TRP(s) is via fronthaul. The BS could also be referred to as a central unit (CU), eNB, or NodeB.

Transmission/Reception Point (TRP): a transmission and reception point provides network coverage and directly communicates with UEs. The TRP could also be referred to as a distributed unit (DU).

Cell: a cell is composed of one or multiple associated TRPs, i.e. coverage of the cell is composed of coverage of all associated TRP(s). One cell is controlled by one BS. The Cell could also be referred to as TRP group (TRPG).

Beam sweeping: in order to cover all possible directions for transmission and/or reception, a number of beams is required. Since it is not possible to generate all these beams concurrently, beam sweeping means to generate a subset of these beams in one time interval and change generated beam(s) in other time interval(s), i.e., changing beam in time domain. So, all possible directions can be covered after several time intervals.

UE beam: a UE beam is a beam of a UE, which is used to communicate with the network, i.e., for transmission and/or reception.

Serving beam: a serving beam for a UE is a beam generated by network, e.g. a TRP, which is used to communicate with the UE, e.g., for transmission and/or reception.

For the network side:
   NR using beamforming could be standalone, i.e., UE can directly camp on or connect to the NR.
      NR using beamforming and NR not using beamforming could coexist, e.g., in different cells.
   TRP would apply beamforming to both data and control signaling transmissions and receptions.
   The number of beams generated concurrently by TRP depends on TRP capability, e.g., the maximum number of beams generated concurrently by different TRPs in the same cell may be the same and those in different cells may be different.
   Beam sweeping is necessary for control signaling to be provided in every direction.
Downlink timing of TRPs in the same cell are synchronized.
RRC layer of network side is in the BS.
TRP should support both UEs with UE beamforming and UEs without UE beamforming, e.g., due to different UE capabilities or UE releases.
For the UE side:
The UE may perform beamforming for reception and/or transmission.
   The number of beams generated concurrently by UE depends on UE capability, e.g. generating more than one beam is possible.
   The beam(s) generated by UE is wider than beam(s) generated by eNB.
   The beam sweeping for transmission and/or reception is generally not necessary for user data but may be necessary for other signaling, e.g. to perform measurement.
   Not every UE supports UE beamforming, e.g. due to UE capability or UE beamforming is not supported in NR in the first (few) release(s).
One UE is possible to generate multiple UE beams concurrently and to be served by multiple serving beams from one or multiple TRPs of the same cell.
   Same or different (DL or UL) data could be transmitted on the same radio resource via different beams for diversity or throughput gain.
There are at least two UE (RRC) states: connected state (or called active state) and non-connected state (or called inactive state or idle state).

After an UE powers on, the UE needs to find a cell to camp on. Then, the UE may initiate a connection establishment to network by itself for registration and/or data transmission. Also, the network could request the UE to initiate a connection establishment to the network via paging, e.g. in order to transmit DL data to the UE.

A case of initial access may have the following steps:
Cell search
Possible carrier frequencies are scanned to find a cell. The cell provides signaling for UEs to identify the cell, e.g. synchronization signal, by beam sweeping. Different TRPs of the same cell would provide the same signaling at the same time interval(s).
Broadcasted system information acquisition
UE acquires necessary parameters, e.g. related to cell selection, from the broadcasted system information. The broadcasted system information is provided by beam sweeping.
Cell measurement & selection
After the UE finds a cell which is possible to camp on, the UE should measure radio condition of the cell and decide whether to camp on the cell based on the measured result. The cell provides signaling for measurement, e.g. reference signal, by beam sweeping. Different TRPs of the same cell would provide the signaling at the same time interval(s).
Paging
Paging may be required when the network would like to transmit UE specific signaling/data and the UE is in non-connected state. When the UE receives paging, the UE should initiate connection establishment to enter connected state for reception. The cell provides paging by beam sweeping.

Connection establishment

UE establishes connection to a Base Station (BS) via connection establishment procedure. During the procedure, the UE needs to perform random access procedure to let the network be aware of the UE and provide resources for UL transmission to the UE. After the connection is established, the UE enters connected state. Initial beam(s) to be used for the following transmission(s) would be decided during the procedure.

Figure 14:
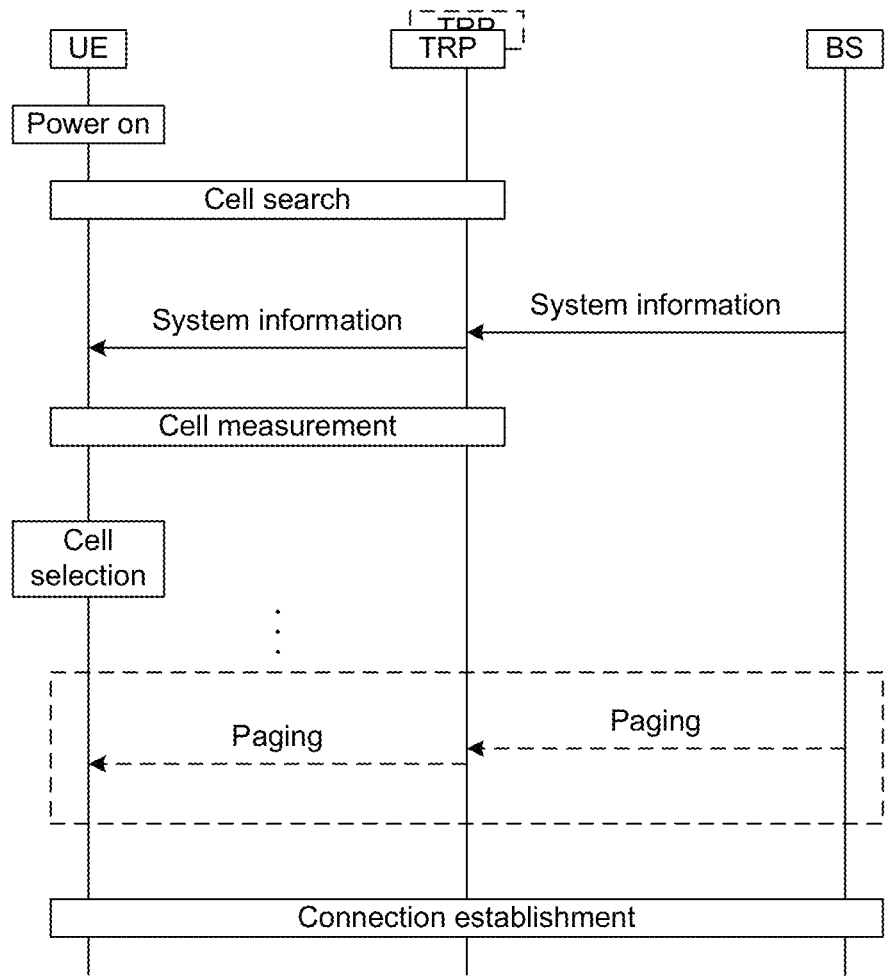
FIG. 14 illustrates a flow chart for initial access.

FIG. 14 illustrates an example of a flow chart for initial access.

After a UE camps on a cell, the UE may move among different beams or TRPs of the cell when the UE is in non-connected state, e.g. idle mode. Or the UE may leave the coverage of the cell and move to coverage of other cell.

A case of mobility for UE in non-connected state may have the following types:

UE beam change

If UE beamforming is used when the UE is in non-connected state, UE beam(s) may be changed, e.g. due to UE rotation.

The UE should keep performing beam sweeping to prevent signaling missing due to UE beam(s) change.

Serving beam or serving TRP change among the same cell

In the cell that UE camps on, the UE is served by TRP(s) whose signaling can be received by the UE. The serving beam(s) of serving TRP(s) may change due to UE mobility. The serving TRP(s) may also change when the UE is moving within camped on cell.

The UE should keep monitoring all possible time intervals for different beams of the serving TRP(s), which provides necessary signaling for the UEs in non-connected state in order to prevent signaling missing.

Cell reselection

The UE keeps performing measurement on the serving cell where the UE camps on and its neighbor cells, and the UE evaluates whether to reselect the serving cell.

The UE acquires system information of a neighbor cell and reselects the neighbor cell as the new serving cell if the UE determines that the neighbor cell is more optimal. Parameters for evaluation from network are required.

Figure 15:
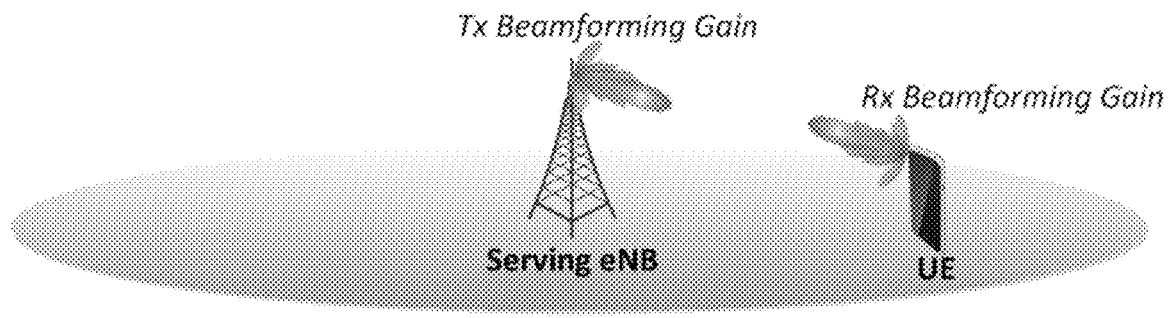
FIG. 15 illustrates gain compensation by beamforming in a HF-NR (High Frequency-New Radio) system.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 15 (as shown in 3GPP R2-162251) illustrates gain compensation by beamforming.

Figure 16:
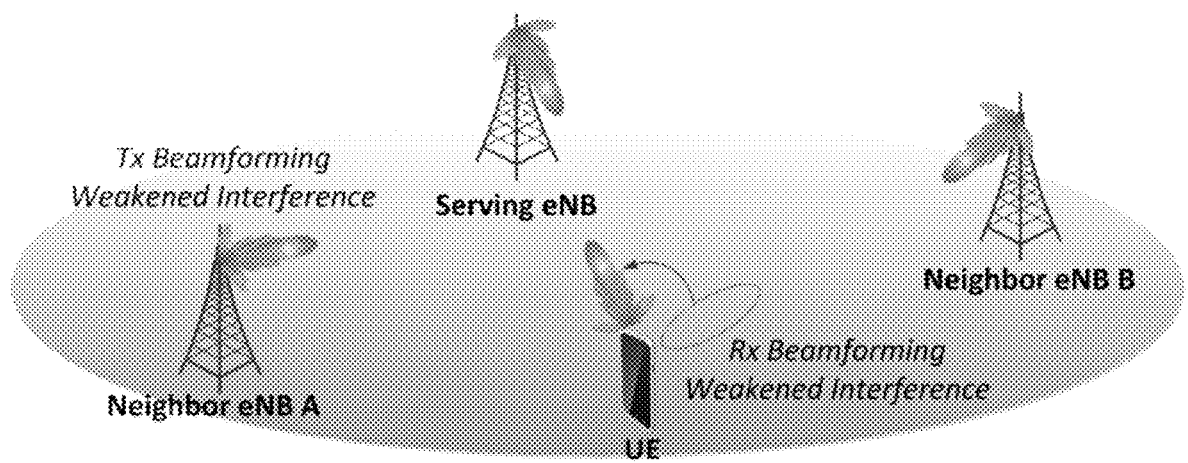
FIG. 16 illustrates weakened interference by beamforming in a HF-NR system.

From a Signal to Interference plus Noise Ratio (SINR) perspective, sharp beamforming reduces interference power from neighbor interferers, i.e. neighbor eNBs in downlink case or other UEs connected to neighbor eNBs. In the transmission (TX) beamforming case, only interference from other TXs whose current beam points the same direction to the reception (RX) will be the "effective" interference. The "effective" interference means that the interference power is higher than the effective noise power. In the RX beamforming case, only interference from other TXs whose beam direction is the same to the UE's current RX beam direction will be the effective interference. FIG. 16 (as shown in 3GPP R2-162251) illustrates weakened interference by beamforming.

When the UE is in connected state, the UE may move among different beams or TRPs of the same serving cell. Besides, if UE beamforming is used, UE beam(s) may also change over time, e.g. due to UE rotation.

A case of mobility in connected state without cell change has the following steps:

Signaling for change detection

The change of UE beam(s), serving beam(s) of serving TRP(s), and serving TRP(s) may be detected by UE and/or network. In order to detect the change, a signaling periodically transmitted by TRP(s) or UE could be used. The TRP(s) periodically performs beam sweeping for reception or transmission of the signaling. If UE beamforming is used, UE periodically performs beam sweeping for reception or transmission of the signaling.

UE beam change

If the change is detected by the UE, the UE, by itself, may select the proper UE beam(s) for the following reception (and transmission, e.g., for Time Division Duplex (TDD)). Alternatively, the UE needs to provide feedback to the network, and the network could provide an indication of a UE beam change from the network to the UE.

If the change is detected by the network, the indication of UE beam change from the network to the UE may be required. The UE uses UE beam(s) indicated by the network for the following transmission (and reception, e.g. for TDD).

Serving beam and/or serving TRP change

After the UE receives the signaling for a change detection, the UE needs to provide feedback to the network. The network could decide whether to change downlink (DL) serving beam(s) and/or serving TRP(s) for the UE. On the other hand, after the TRP(s) receive(s) the signaling for the change detection, the network could decide whether to change serving beam(s) and/or the serving TRP(s) for the UE.

Figure 17:
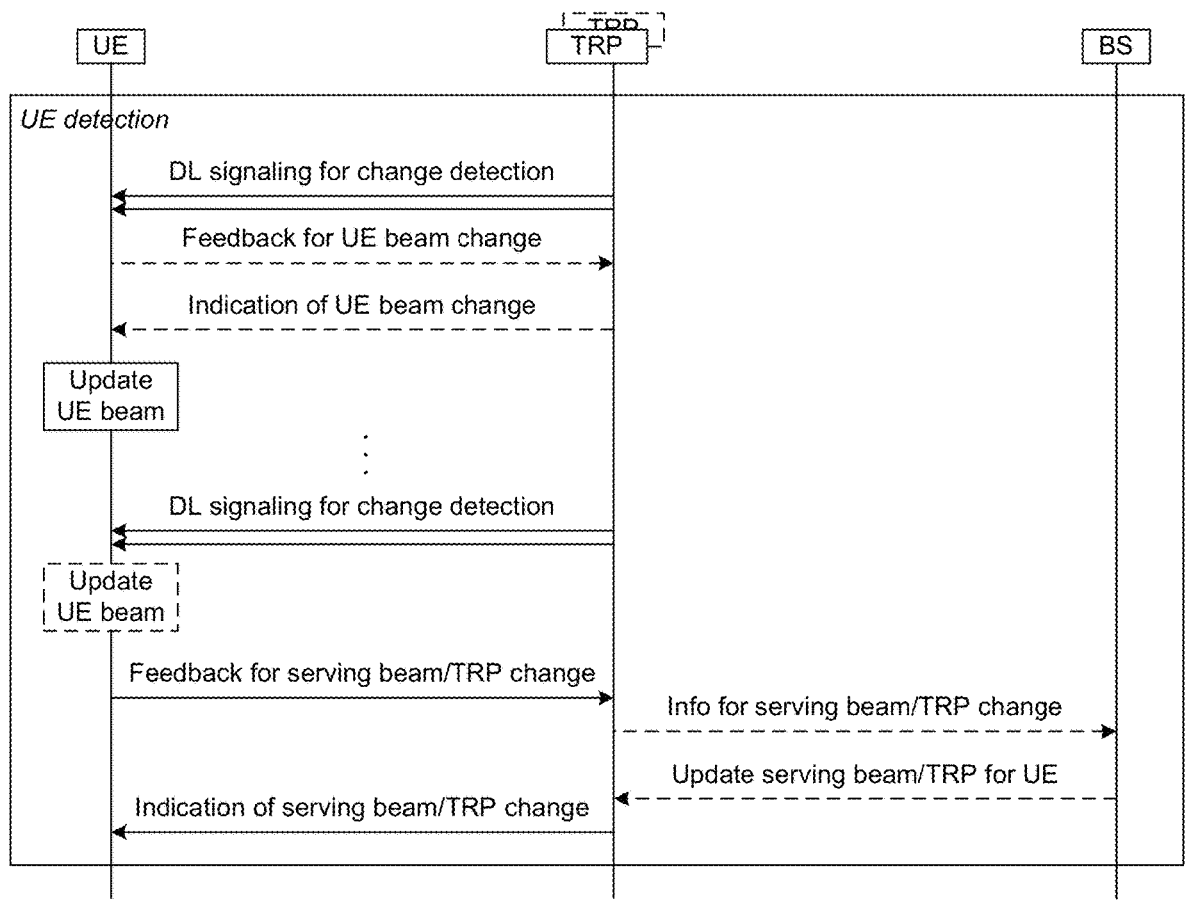
FIG. 17 illustrates a flow chart for mobility in a connected state without cell change (based on UE detection).
Figure 18:
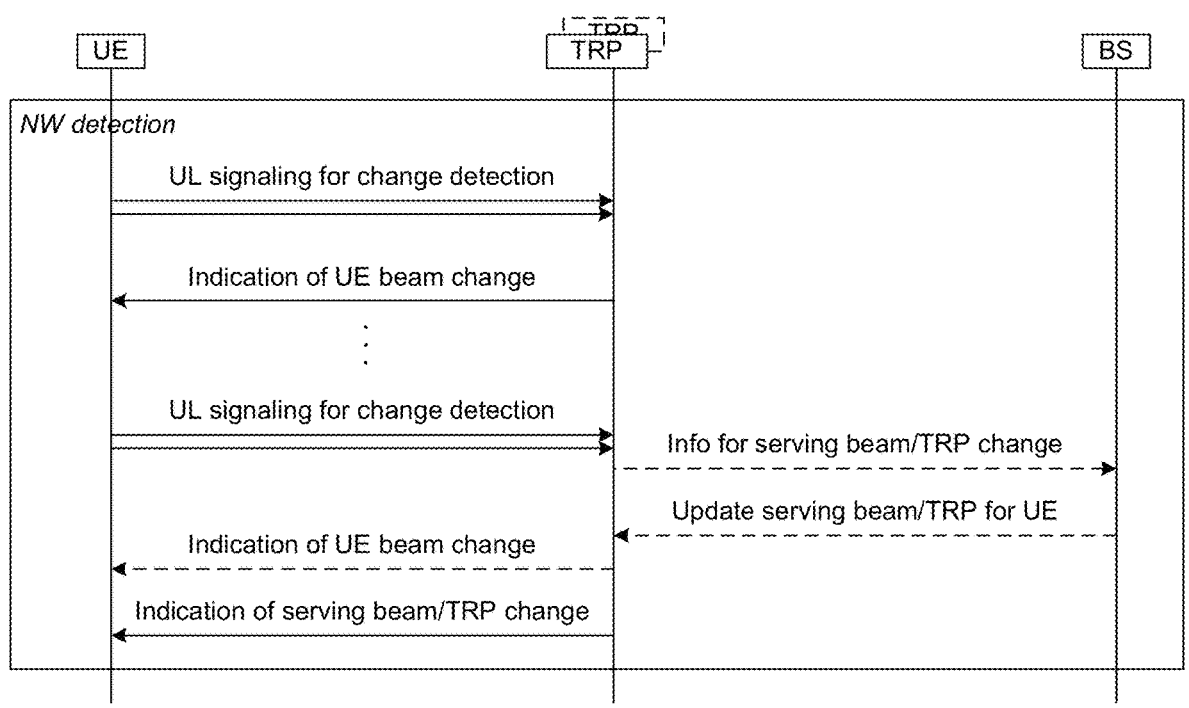
FIG. 18 illustrates a flow chart for mobility in connected state without cell change (based on network detection).

FIG. 17 and FIG. 18 illustrate examples of flow charts for mobility in connected state without cell change.

When the UE is in connected state, the UE may leave the coverage of the serving cell and move to coverage of another cell. It is assumed that the UE needs to perform measurement in order to help detection of a cell change. The network would control the change of UE's serving cell, e.g., via handover.

Measurement

The UE should perform measurement on the serving cell and its neighbor cells to find better serving cell based on a measurement configuration. The signaling to be measured is provided by beam sweeping. If UE beamforming is used, the UE performs beam sweeping for reception of the signaling.

In addition, radio quality of the serving cell should be monitored by the UE in order to detect any radio link failure. If a radio link failure is detected, the UE should try to recover the radio link.

Measurement report

Based on the measurement result, the UE should provide a measurement report to the serving BS.

Handover initiation

Based on the measurement report, the serving BS may decide to handover the UE to a target cell of a neighboring BS based on a negotiation between the serving BS and the neighbor BS. Then, the serving BS would transmit a handover command indicating a target cell to the UE.

Handover to target cell
  The UE should attempt to connect to the target cell for continuing the ongoing services Since 0 ms mobility interruption is required, the connection between the UE and the source cell should be kept when the UE tries to connect to the target cell. The connection can be released after the UE successfully accesses the target cell. During handover, the UE needs to perform random access procedure to let the target cell be aware of the UE.

Figure 19:
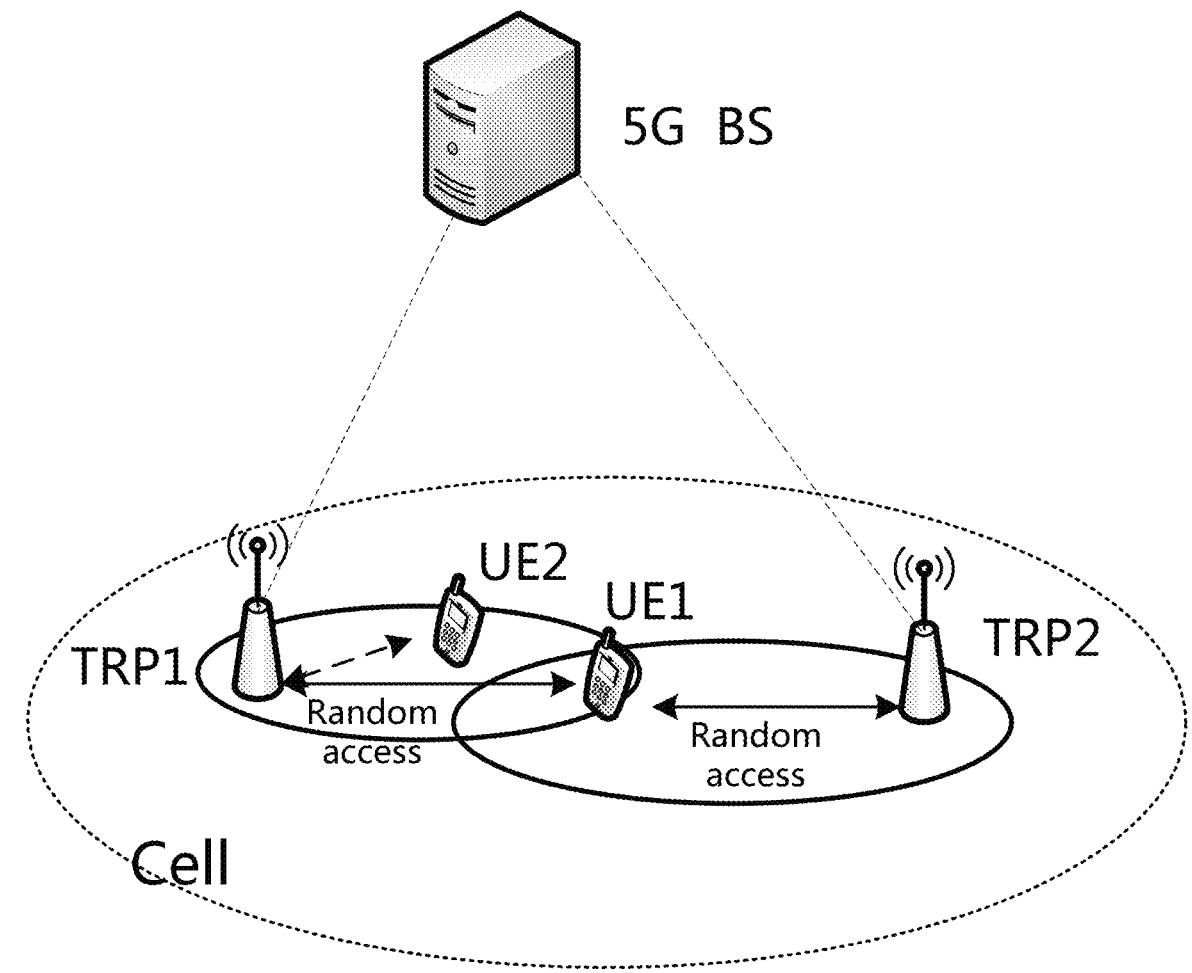
FIG. 19 illustrates random access involving multiple TRPs.

Since a cell may be composed of multiple TRPs, a UE may be in the coverage of multiple TRPs of the cell. In this scenario, the operations of random access procedure, including failure cases (e.g. contention failure), should be considered. FIG. 19 illustrates an example of random access involving multiple TRPs.

Any information to be provided during the random access procedure such as, but not limited to, reduce power consumption, delay to complete the procedure, and/or possibility of contention, should be considered.

In addition, a cell would support both UEs using beamforming and UEs not using beamforming. These UEs may perform random access simultaneously. The impact of this factor should be analyzed and improved, if any.

Figure 20:
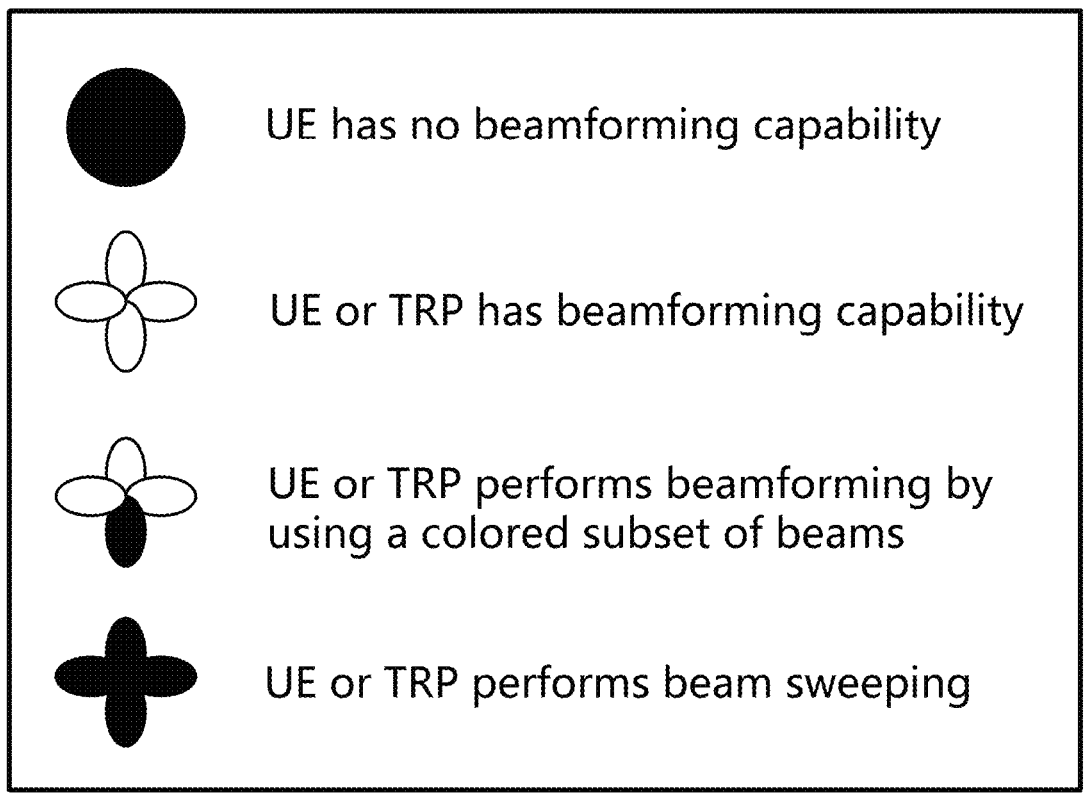
FIG. 20 defines the icons related to beamforming that are utilized in FIGS. 21-31.

The meanings of icons illustrated in FIGS. 21-31 are shown in FIG. 20.

For contention based random access, e.g. used for initial access, contention is possible and contention resolution is required. In the scenario where multiple TRPs may be involved in a random access procedure, a random access preamble transmitted by a UE may be received by one or multiple TRPs via their one or multiple beams, i.e. assuming that these TRPs share the same preamble resources. Then, the multiple responses to the preamble, e.g. Msg2, would be provided by multiple TRPs. Considering the random access mechanism in LTE as disclosed in 3GPP TS 36.321 as a baseline, the UE generally utilizes Uplink (UL) grant provided by the first received response to perform a Msg3 transmission. As a result, the resources for other response(s) may be unnecessarily wasted.

Figure 21:
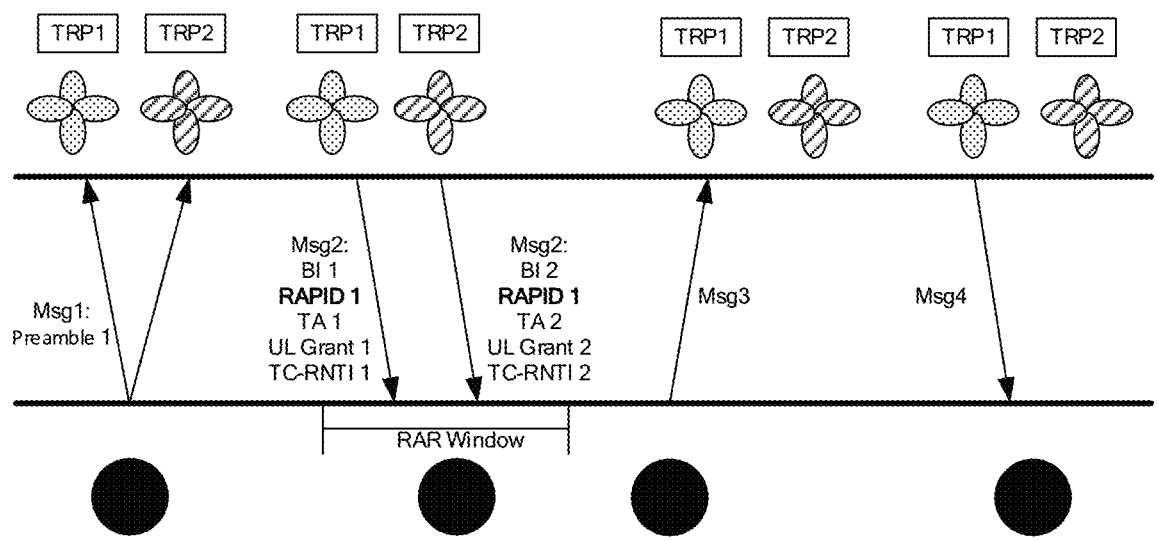
FIG. 21 illustrates LTE random access mechanism involving two TRPs.

An example in FIG. 21 shows that random access mechanism in LTE is used by UE1 in FIG. 19. FIG. 21 shows resources for Msg2 from TRP2 are unnecessarily wasted.

Figure 22:
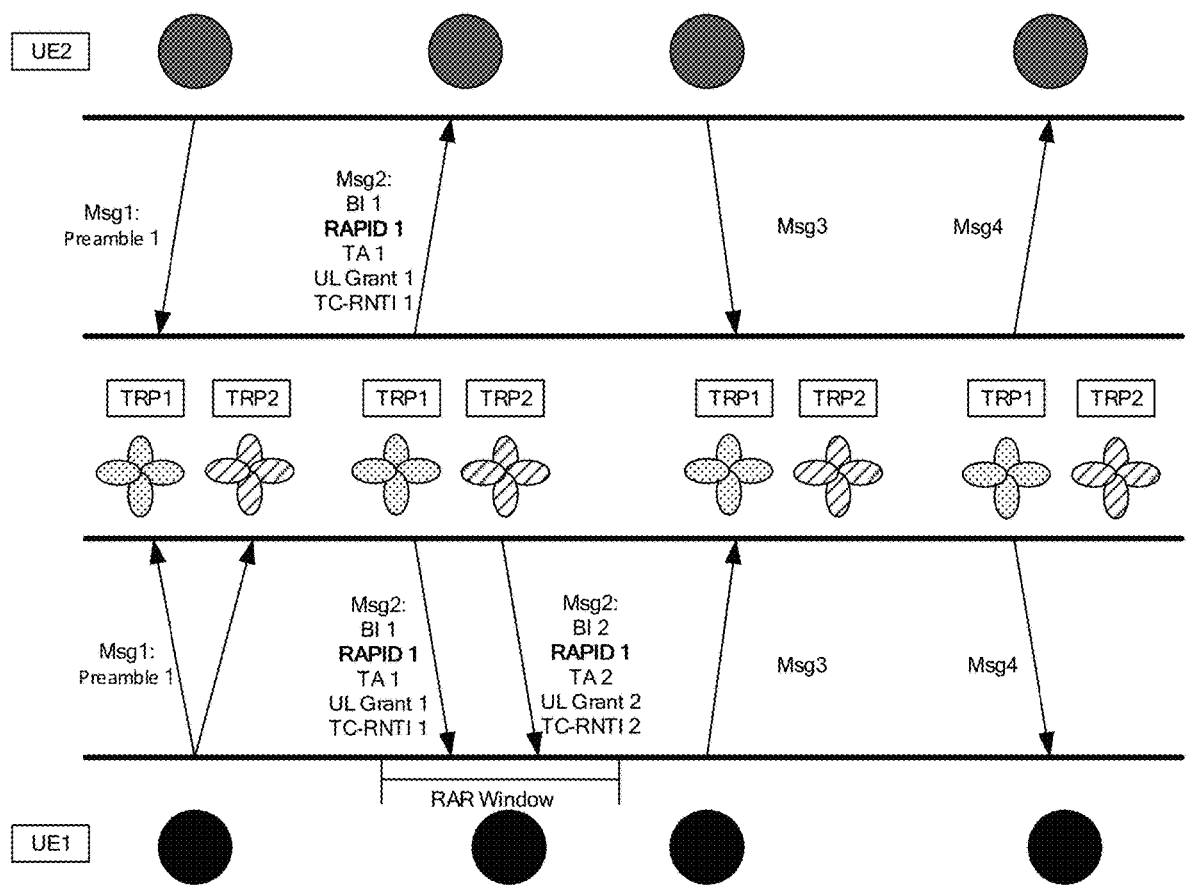
FIG. 22 illustrates LTE random access mechanism involving two UEs and two TRPs.

Another example in FIG. 22 shows that random access contention occurs for UE1 and UE2 in FIG. 19. FIG. 22 shows resources for Msg2 from TRP2 are unnecessarily wasted. FIG. 22 shows that the first received response may not always be the most proper one.

To solve above issue(s), an alternative to operate random access procedure with one or multiple actions described as below could be used.

Figure 23:
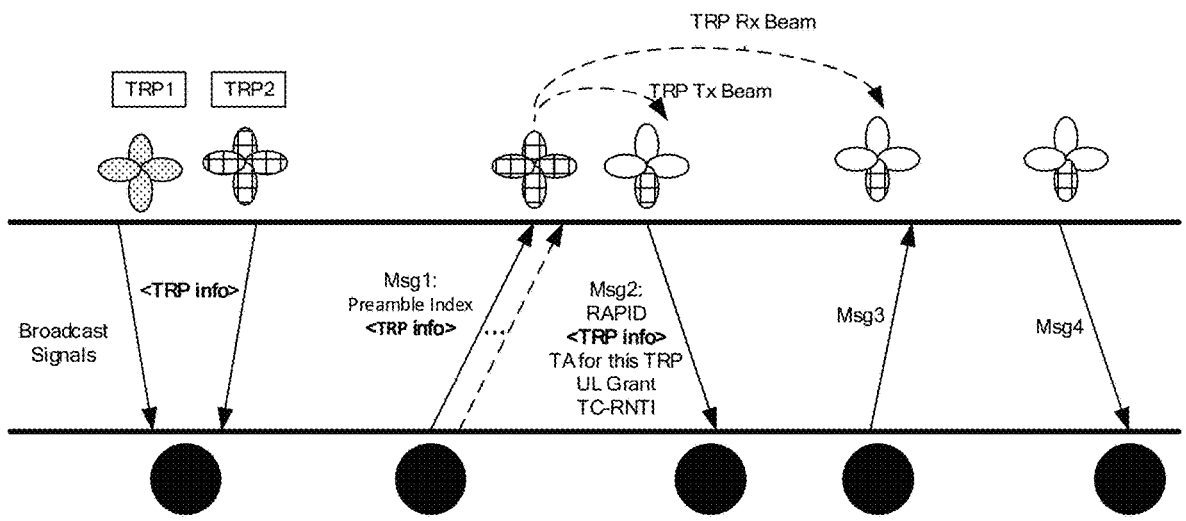
FIG. 23 illustrates one embodiment of a random access procedure (without UE beamforming).
Figure 24:
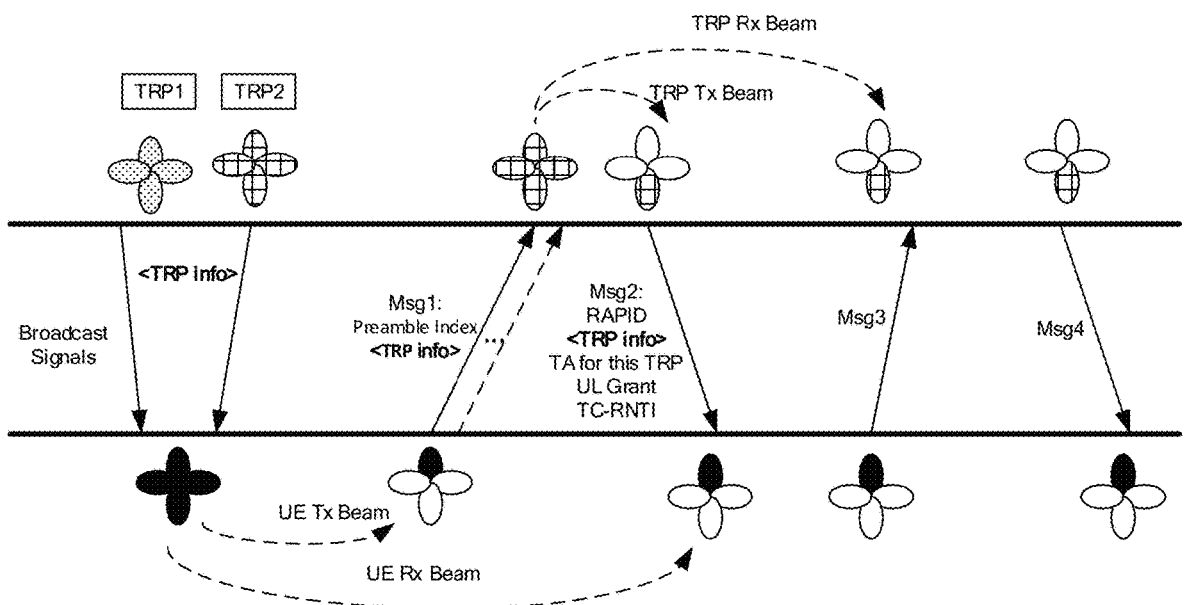
FIG. 24 illustrates one embodiment of a random access procedure (with UE beamforming).
Figure 25:
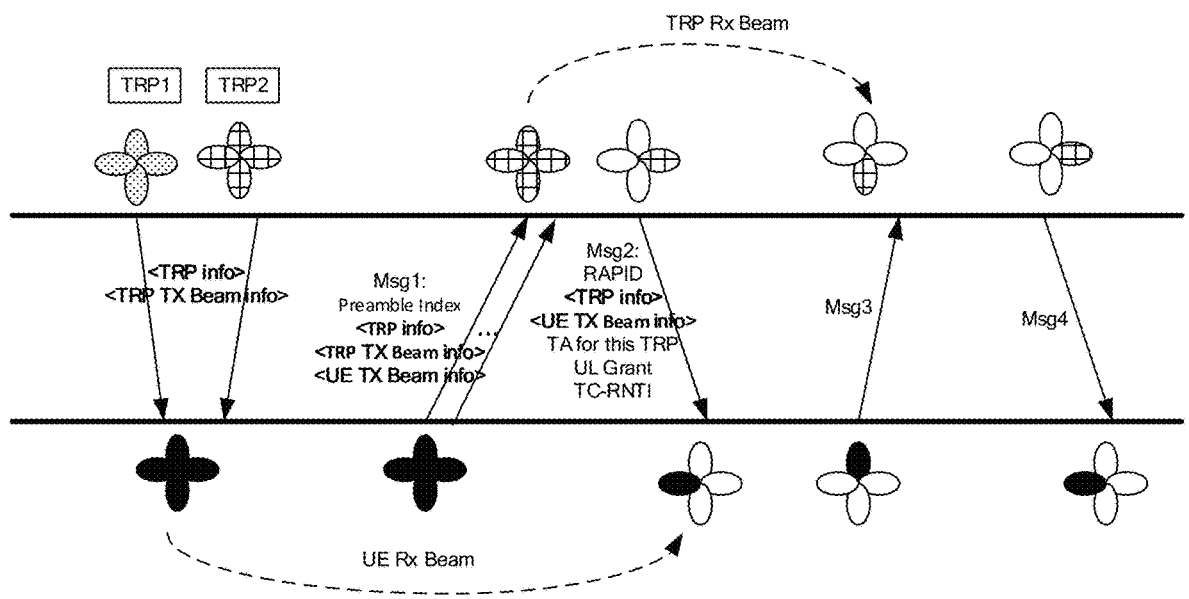
FIG. 25 illustrates one embodiment of a random access procedure (no DL/UL reciprocity).

If Downlink (DL) and Uplink (UL) channels are reciprocal, e.g. Time Division Duplex (TDD), in the scenario that TRPs have beamforming capability but the UE has not, it is assumed that contention based random access procedure similar to LTE (e.g. there are four handshaking steps) would be used. The random access procedure has the steps as illustrated in FIG. 23.
  TRP selection
    Before initiating the random access procedure, the UE would measure signals, e.g. BRS or discovery signal, broadcasted by TRPs to determine which TRP is the best or qualified to connect with. Selecting the TRP could be based on a measured channel quality of the TRP and/or the number of qualified beams of the TRP. In addition, the UE could differentiate different TRPs based on the signals, e.g. time frequency resource used to transmit the signal or the TRP information included in the signals. After the UE selects the TRP, the UE could initiate the random access procedure.
  Msg1 transmission
    The UE could implicitly or explicitly indicate which TRP the UE would like to access via Msg1, e.g. on Physical Random Access Channel (PRACH). Several alternatives for implicit or explicit indication could be:
      Transmission resources for Msg1 could be separated for different TRPs, e.g. different timing and/or frequency. The UE could derive corresponding transmission resources for Msg1 from the broadcast signal (e.g. Beam specific reference signal (BRS), synchronization signal, system information signal, or etc.) transmitted by TRPs.
      The preamble index to be carried by Msg1 could be separated for different TRPs. For example, preamble index 0 to 4 is for TRP1, preamble index 5 to 9 is for TRP2, and the like.
      Msg1 could carry an indication to indicate TRP, e.g., partial or complete information. For example, a 2-bit indication is sufficient for the case where there are 4 surrounding TRPs.
    Since several TRPs may receive the Msg1 from the same UE, the objective to provide such indication via Msg1 is to help the TRPs decide whether to provide response(s), e.g. Msg2, in order to prevent signaling overhead.
    The beam(s) used to receive Msg1 by the TRP could be the beam(s) used to transmit Msg2 and Msg4 or used to receive Msg3.
  Msg2 reception
    If the UE needs to transmit Msg1 several times due to TRP beam sweeping for Msg1 reception, the time to start monitoring Msg2, e.g. beginning of monitoring window, should be based on the very first transmission of Msg1. The duration to monitor Msg2 is based on number of times Msg1 is transmitted.
    Msg2, e.g. random access response, could implicitly or explicitly indicate which TRP transmits the Msg2. Several alternatives for implicit or explicit indication could be:
      Msg2 could be scrambled by a sequence, e.g. RA-RNTI, which is TRP specific. For example, the sequence is calculated based on TRP information, e.g. RA-RNTI=1+t_id+10*f_id+100*TRP_id. Then, Msg2 would be descrambled successfully by the UE if Msg2 is transmitted by the selected TRP.
      Msg2 could carry an indication, e.g. TRP information, to indicate the TRP who transmits the Msg2.
    With the indication, the UE can determine whether the Msg2 may be for the UE or for other UE(s) selecting other TRP(s) in order to prevent utilizing improper Msg2.
  Msg3 transmission and Msg4 reception
    In the scenario that both TRPs and the UE have beamforming capability, the UE would perform beam sweeping for selecting TRP as well as UE beam(s) for the random access procedure as shown in FIG. 24.
    FIG. 25 shows an example that if reciprocity for DL and UL is not assumed, e.g. Frequency Division Duplex (FDD), the beam(s) used for transmission may not be the same as beam(s) used for reception between a pair of UE and TRP. In order to reduce signaling overhead and delay, the proper TRP beam(s) and UE beam(s) should be determined as soon as possible during the random access procedure.

If beams of a TRP could be differentiated by the UE, the UE could select proper TRP beam(s), e.g. best or qualified beam(s), during TRP selection. Then, the UE could indicate, via Msg1, which beam(s) of TRP the UE suggests for transmission by the TRP. After receiving Msg1, the TRP could use the indicated beam(s) to transmit Msg2 and Msg4 without performing beam sweeping.

If UE beamforming of a UE is used, it is necessary for the UE to perform beam sweeping to transmit Msg1 because the UE may not know which UE beam(s) for transmission is proper for the selected TRP. The UE could indicate, via Msg1, which UE beam(s) is used for Msg1 transmission. After receiving Msg1, the TRP could indicate, via Msg2, which UE beam(s) should be used by the UE to transmit Msg3.

Figure 26:
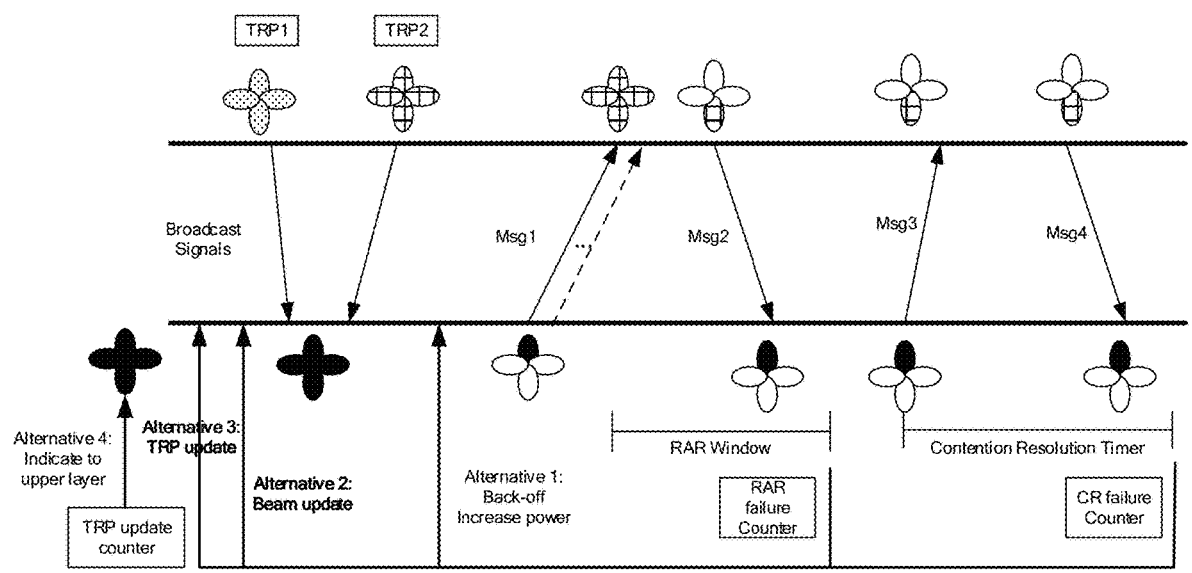
FIG. 26 illustrates one embodiment of handling a failure attempt during a random access procedure.

Several attempts to access may be performed by the UE during a random access procedure as illustrated in FIG. 26. An attempt may be considered not successful, e.g. if associated Msg2 or Msg4 cannot be received during a period of time. There are several alternatives to handle the situation where an attempt is considered not successful:
Alt1: To do Back-off and increase transmission power
  If the number of failure attempts is lower than a threshold, the UE could wait a period of time and increase transmission power for the next attempt.
Alt2: Beam update/Alt3: TRP update
  The UE could measure the signals broadcasted by TRP(s) to check whether to update the selected TRP, TRP beam(s), and/or UE beam(s). A check could be performed if the number of failure attempts is larger than a threshold. If the UE determines to update the selected TRP, TRP beam(s), and/or UE beam(s), the counter for number of failure attempts and/or transmission power could be reset.
Alt4: Indicate the RA problem to the upper layer
  While the TRP update counter (a counter for number of times to update selected TRP) is reaching a maximum number or the UE could not find any qualified TRP or beam, the UE could indicate the RA problem to the upper layer.

Another alternative to operate random access procedure with one or multiple actions described as below could be used.

Figure 27:
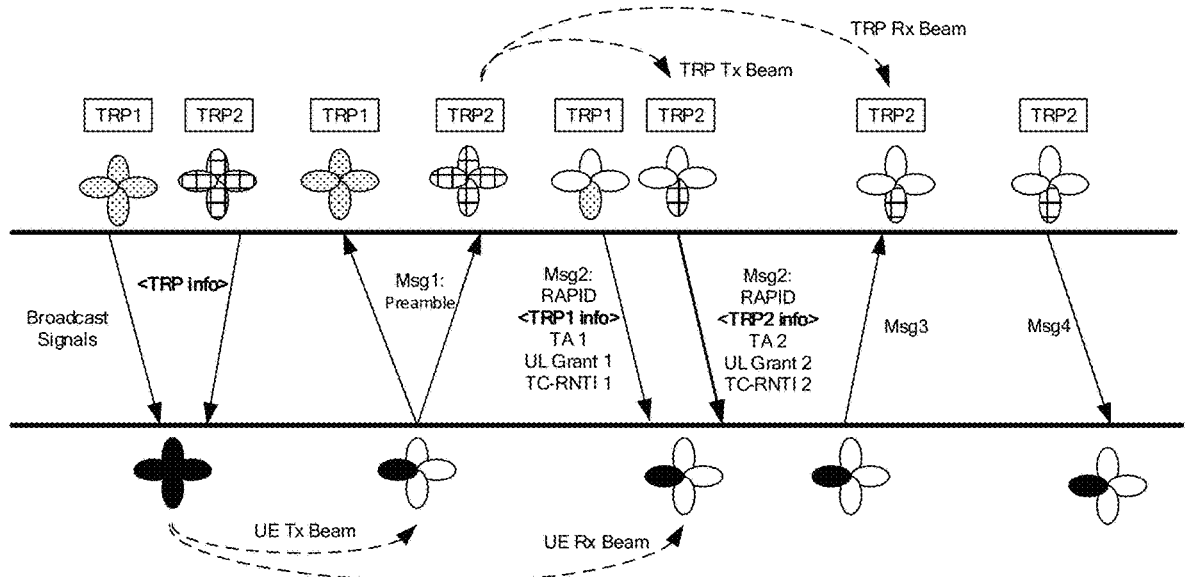
FIG. 27 illustrates one embodiment of a random access procedure (with UE beamforming).
Figure 28:
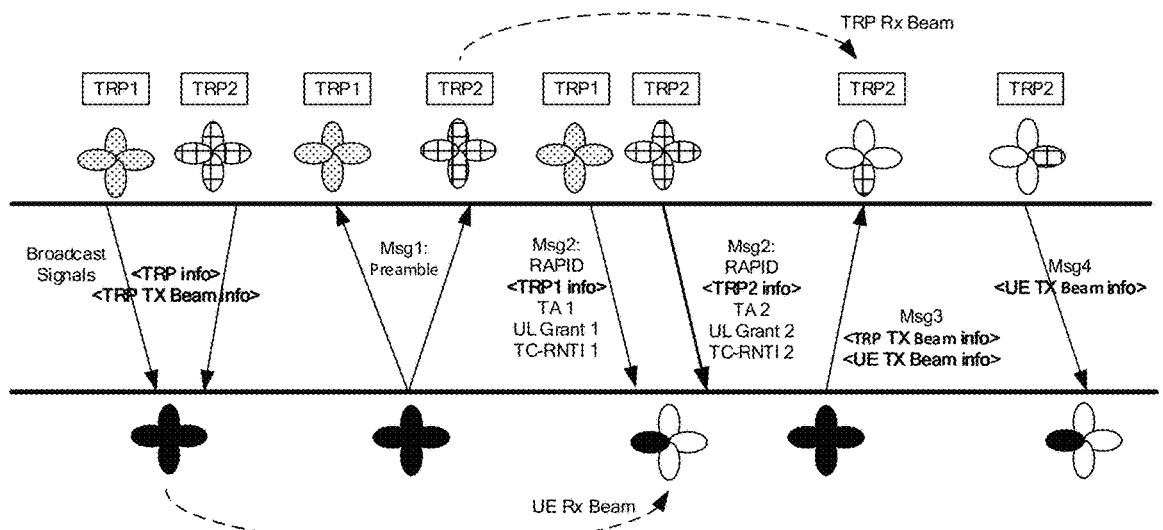
FIG. 28 illustrates one embodiment of a random access procedure (no DL/UL reciprocity).

If DL and UL channels are reciprocal, e.g. TDD, the random access procedure has the steps as illustrated in FIG. 27.
TRP selection (optional)
  Before initiating the random access procedure, the UE could measure signals, e.g. BRS or discovery signal, broadcasted by TRPs to determine which TRP is the best or qualified to connect. Selecting the TRP could be based on the measured channel quality of the TRP and/or the number of qualified beams of the TRP. In addition, the UE could differentiate different TRPs based on the signals, e.g. time frequency resource used to transmit the signal or TRP information is included in the signals. After the UE selects the TRP, the UE could initiate random access procedure.
Msg1 transmission
  Several TRPs may receive the Msg1 from the same UE and respond with Msg2 separately (which may include different Timing Advance (TA), UL grant, and/or Temporary Cell-Radio Network Temporary Identifier (TC-RNTI)). The beam(s) used to receive Msg1 by the TRP could be the beam(s) used to transmit Msg2 and Msg4 or be used to receive Msg3.
Msg2 reception
  If the UE needs to transmit Msg1 for several times due to TRP beam sweeping for Msg1 reception, the time to start monitoring Msg2, e.g. beginning of monitoring window, should be based on the very first transmission of Msg1. The duration to monitor Msg2 is based on number of times to transmit Msg1.
  Msg2, e.g. random access response, from different TRPs could implicitly or explicitly indicate which TRP transmits the Msg2. Several alternatives for implicit or explicit indication could be:
    Msg2 could be scrambled by a sequence, e.g. RA-RNTI, which is TRP specific. For example, the sequence is calculated based on TRP information, e.g. RA-RNTI=1+t_id+10*f_id+100*TRP_id. Then, Msg2 would be descrambled successfully by the UE if Msg2 is transmitted by the selected TRP.
    Msg2 could carry an indication, e.g. TRP information, to indicate the TRP who transmits the Msg2.
  With the indication, the UE can determine which Msg2 should be utilized by the UE, e.g. based on previous TRP selection or selecting a received Msg2 with best signal strength during a period of time to monitor Msg2.
Msg3 transmission and Msg4 reception FIG. 28 show an example that if DL and UL channels are not reciprocal, e.g. FDD, the beam(s) used for transmission may not be the same as the beam(s) used for reception between a pair of UE and TRP. In order to reduce signaling overhead and delay, the proper TRP beam(s) and UE beam(s) should be determined as soon as possible during the random access procedure.

If beams of a TRP could be differentiated by the UE, the UE could select proper TRP beam(s), e.g. best or qualified beam(s), during monitoring broadcast signals from the TRPs. Then, the UE could use the selected beam(s) to receive Msg2. And the UE could indicate, via Msg3, which beam(s) of the TRP the UE suggests for transmission by the TRP. After receiving Msg3, the TRP could use the indicated beam(s) to transmit Msg4 without performing beam sweeping. In some embodiments, "qualified" as used herein can mean "better or greater than a threshold".

If UE beamforming is used, the UE is necessary to perform beam sweeping to transmit Msg3 because the UE may not know which UE beam(s) for transmission is proper for the selected TRP. The UE could indicate, via Msg3, which UE beam(s) is used for Msg3 transmission. After receiving Msg3, the TRP could indicate, via Msg4, which UE beam(s) should be used by the UE to transmit any following UL transmissions.

For contention free random access, e.g. used for handover, a dedicated preamble for a UE would be required. It is inefficient if the dedicated preamble needs to be reserved for the UE in all TRPs of a cell. Alternative means should be considered.

To solve above issue(s), an alternative to operate random access procedure with one or multiple actions described as below could be used.

In a measurement report, the UE could provide measured results related to TRP(s) (and beam(s)) of a neighbor cell. A source BS could indicate the results to a target BS who controls a neighbor cell. And the target BS could decide which target TRP to reserve resources, e.g. dedicated preamble as well as PRACH resource, for the UE. Then, the source BS would provide the dedicated preamble as well as the PRACH resource associated with the target TRP to the UE.

Since several TRPs may receive the Msg1 from the same UE, the UE could implicitly or explicitly indicate which TRP the UE would like to access via Msg1, e.g. on PRACH, to help the TRPs decide whether to provide response(s), e.g. Msg2. Several alternatives for implicit or explicit indication could be:

- The transmission resources for Msg1 could be separated for different TRPs, e.g. different timing and/or frequency.
- The preamble index to be carried by Msg1 could be separated for different TRPs. For example, preamble index 0 to 4 is for TRP1, preamble index 5 to 9 is for TRP2, and so on and so forth.
- Msg1 could carry an indication to indicate TRP, e.g., partial or complete TRP information. For example, a 2-bit indication is sufficient for the case where there are 4 surrounding TRPs.

Msg2, e.g. random access response, could implicitly or explicitly indicate which TRP transmits the Msg2 for the UE to determine whether random access is successfully completed. Several alternatives for implicit or explicit indication could be:

- Msg2 could be scrambled by a sequence, e.g. RA-RNTI, which is TRP specific. For example, the sequence is calculated based on TRP information, e.g. RA-RNTI=1+t_id+10*f_id+100*TRP_id. Then, Msg2 would be descrambled successfully by the UE if Msg2 is transmitted by the selected TRP.
- Msg2 could carry an indication, e.g. TRP information, to indicate the TRP who transmits the Msg2.

Figure 29:
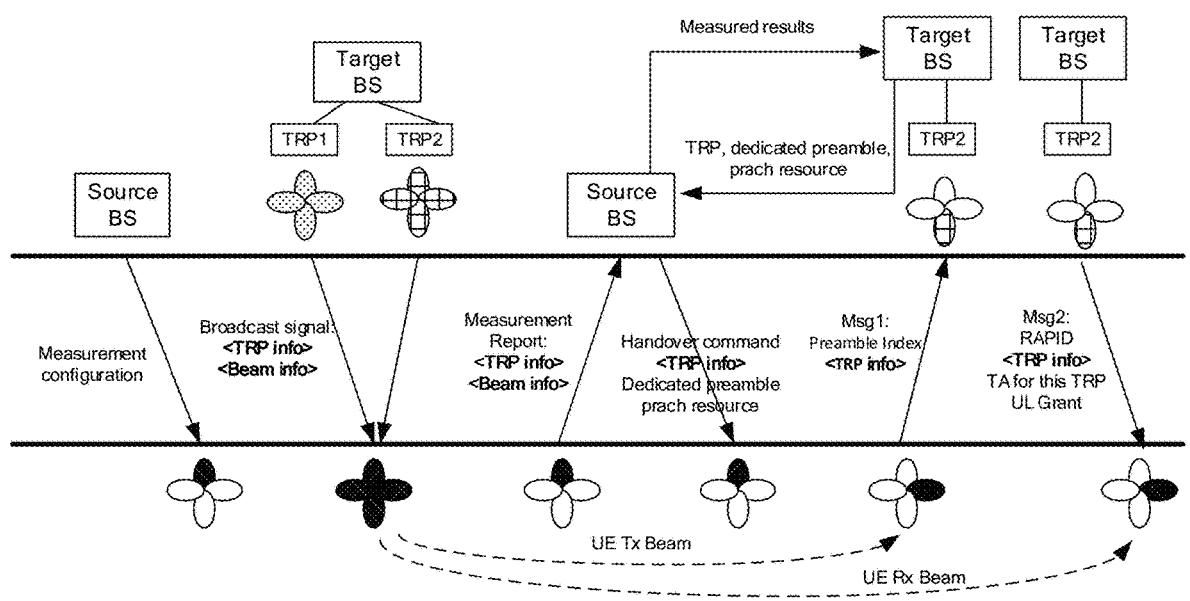
FIG. 29 illustrates one embodiment of a random access procedure for handover.

FIG. 29 shows an example that if DL and UL channels are reciprocal, e.g. TDD, a target TRP could use beam(s) based on the indicated measured results to receive Msg1 and transmit Msg2 without performing beam sweeping.

Figure 30:
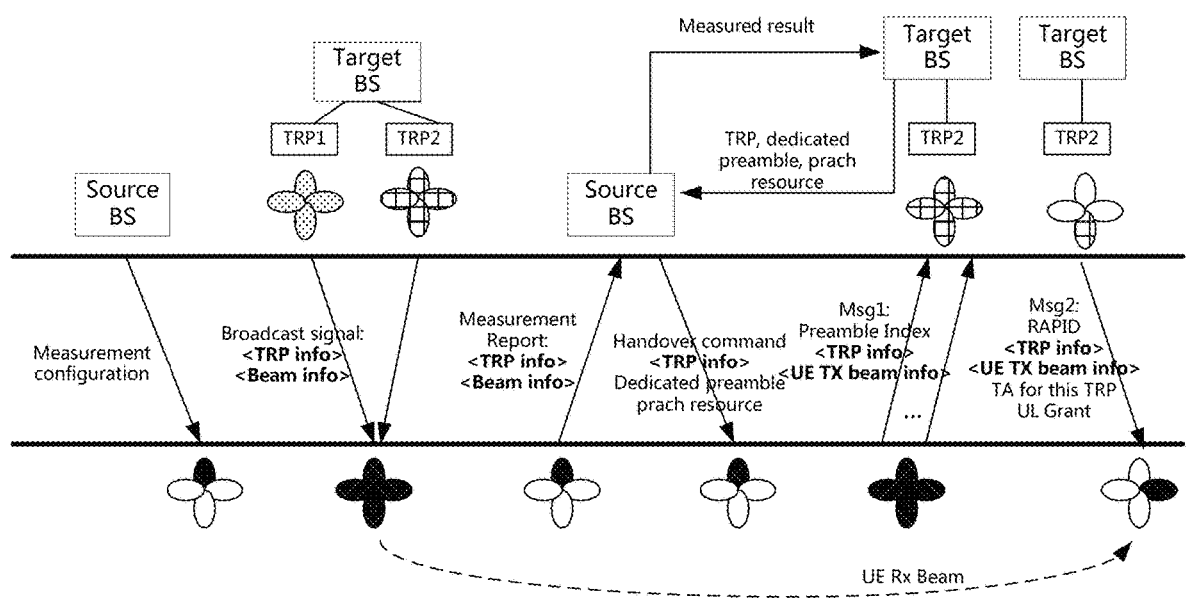
FIG. 30 illustrates one embodiment of a random access procedure for handover (no DL/UL reciprocity).

FIG. 30 shows another example that if DL and UL channels are not reciprocal, e.g. FDD, the beam(s) used for transmission may not be the same as the beam(s) used for reception between a pair of UE and TRP. Hence, a target TRP could only determine beam(s) for transmission based on the indicated measured results, and the target TRP may need to perform beam sweeping for receiving Msg1. If UE beamforming is used, the UE is necessary to perform UE beam sweeping to transmit Msg1 because the UE may not know which UE beam(s) for transmission is proper for the target TRP. The UE could indicate, via Msg1, which UE beam(s) is used for Msg1 transmission. After receiving Msg1, the target TRP could indicate, via Msg2, which UE beam(s) should be used by the UE to transmit following UL transmissions.

Figure 31:
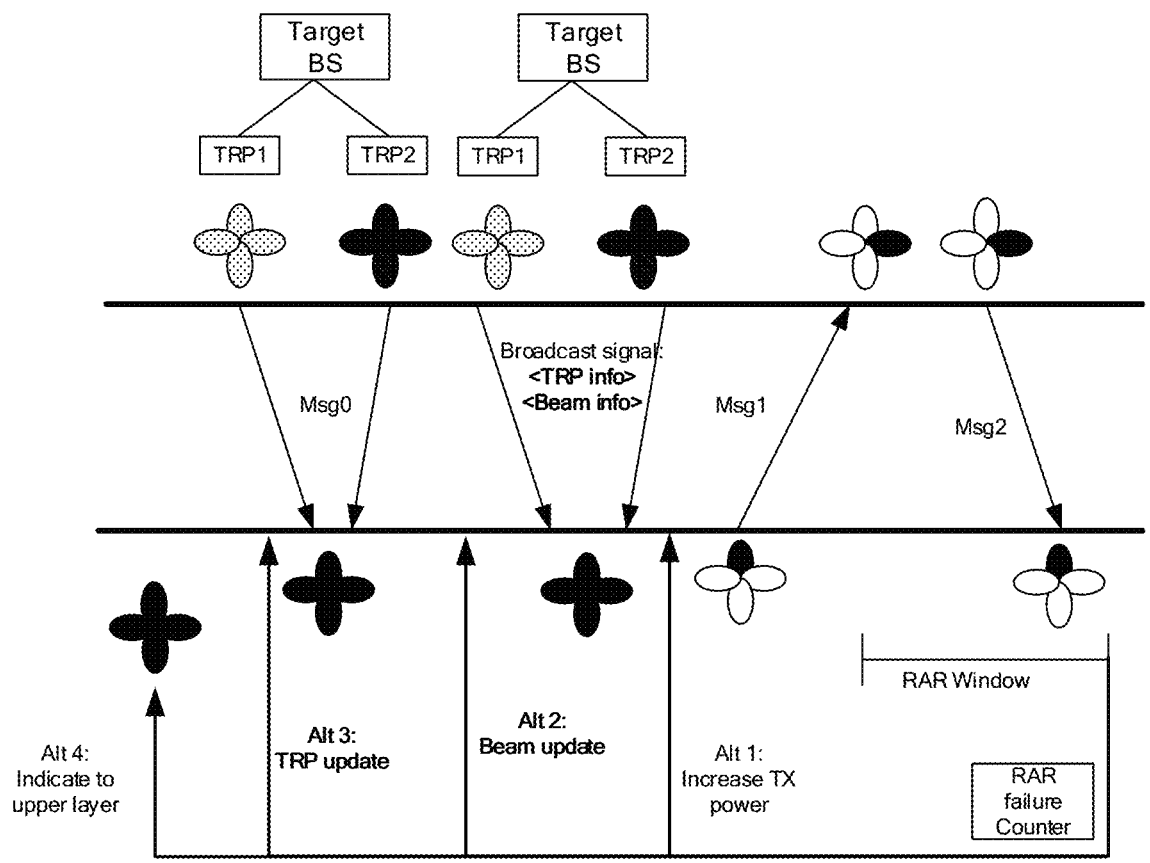
FIG. 31 illustrates one embodiment of handling a failure attempt during a random access procedure for handover.

Several attempts to access may be performed by the UE during a random access procedure as illustrated in FIG. 31. An attempt may be considered unsuccessful, e.g. if associated Msg2 cannot be received during a period of time. There are several alternatives to handle the case that an attempt is considered unsuccessful:

Alt1: Increase transmission power
  If number of failure attempts is lower than a threshold, the UE could increase transmission power for the next attempt.

Alt2: Beam update
  The UE could measure signals broadcasted by the target TRP to check whether to update the associated TRP beam(s) and/or the UE beam(s). The check could be performed if the number of failure attempts is larger than a threshold. If it is determined to update, the counter for number of failure attempts and/or transmission power could be reset.

Alt3: TRP update
  If the target BS or the target TRP waits for a period of time, and finds that the UE could not successfully connect to the target TRP, the target BS could request the TRP(s) of the target BS to transmit signal(s), which trigger random access procedure, to the UE. The signal(s), e.g. like PDCCH order in LTE, may include a dedicated preamble. If the UE receives the signal, even during ongoing random access procedure, the UE may decide to stop the ongoing random access procedure and initiate a new random access procedure based on the signal, e.g. target TRP and/or utilized beam(s) may be changed.

Alt4: Indicate the RA problem to the upper layer
  While TRP update counter (a counter to count for number of times to update selected TRP) is reaching a maximum number or the UE could not find any qualified TRP or beam, the UE could indicate the RA problem to the upper layer.

Figure 32:
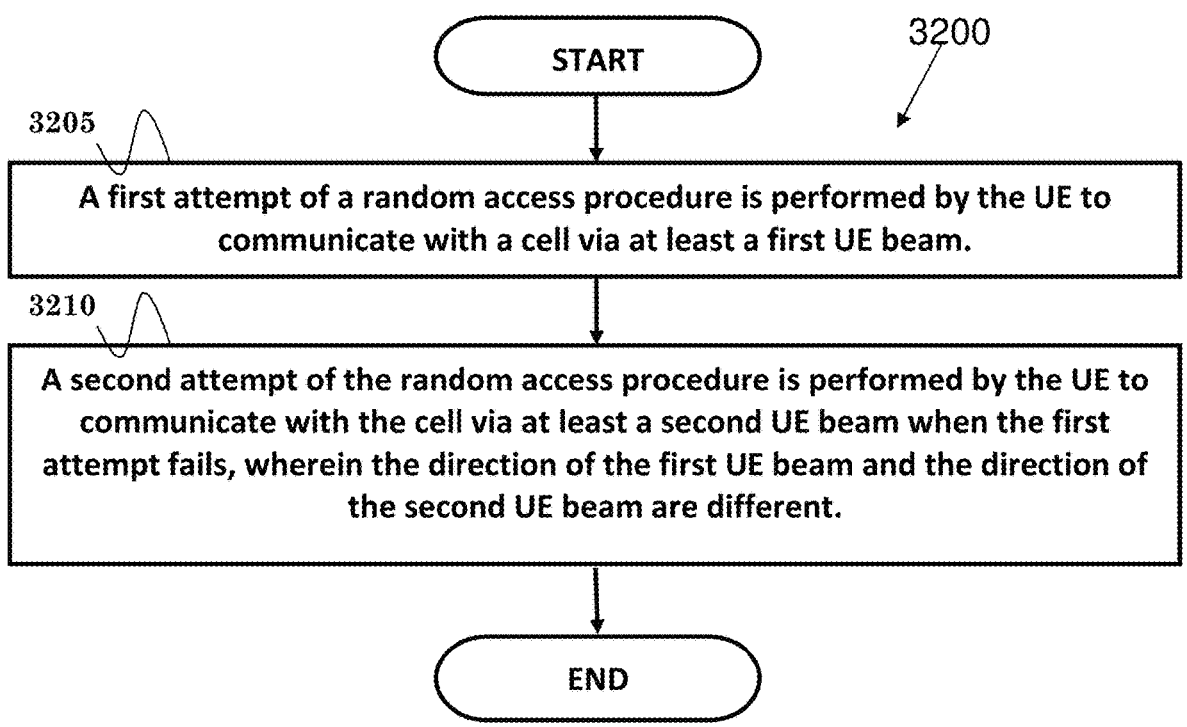
FIG. 32 is a flow chart according to one exemplary embodiment.

FIG. 32 is a flow chart 3200 according to one exemplary embodiment from the perspective of a UE. In step 3205, a first attempt of a random access procedure is performed by the UE to communicate with a cell via at least a first UE beam. In step 3210, a second attempt of the random access procedure is performed by the UE to communicate with the cell via at least a second UE beam when the first attempt fails, wherein the direction of the first UE beam and the direction of the second UE beam are different.

In one method, the second UE beam is selected based on a measurement. In an alternate method, the first UE beam is changed to the second UE beam when a number of failure attempts of the random access procedure is larger than or equal to a threshold.

According to one method, if the first beam is changed to the second UE beam, a counter for a number of failure attempts is reset. Alternatively, if the first beam is changed to the second UE beam, a counter for a number of failure attempts is not reset.

In one method, if the first beam is changed to the second UE beam, transmission power used for the random access procedure is reset. Alternatively, if the first beam is changed to the second UE beam, transmission power used for the random access procedure is not reset.

In one method, if the first beam is changed to the second UE beam, buffered data to be transmitted via a third signal of the random access procedure is kept or not flushed.

In one method, the first attempt includes transmitting a first random access preamble via at least the first UE beam and the second attempt includes transmitting a second random access preamble via at least the second UE beam. The first attempt fails if associated random access response or contention resolution cannot be received during a period of time. The first UE beam is changed to the second UE beam based on a measurement. In one embodiment, the first random access preamble could be the same as the second random access preamble. In another embodiment, the first random access preamble could be different from the second random access preamble.

According to one method, a network forms a cell comprising at least a first network node and a second network node. The network allocates resources for random access procedure, wherein the resources associated with the first network node is different from the second network node. In one method, the resources for random access procedure are preamble sequences. The resources for the random access procedure can be time/frequency resources used to transmit a first signal of the random access procedure.

According to yet another method, a UE performs a measurement to measure a signal in a cell, wherein the cell comprises multiple network nodes broadcasting the signal. The UE performs a random access procedure to communicate with a specific network node of the multiple network nodes, wherein the specific network node is determined by the UE based on the measurement.

In another method, the UE receives a configuration, e.g., via system information, used to perform the random access procedures from the specific network node. Alternatively, the UE receives a configuration, e.g., via system information, used to perform the random access procedures from a network node which is not the specific network node.

The configuration includes parameters associated with different network nodes and the UE uses the part which is associated with the specific network node, based on the determination, to perform the random access procedure. The parameters are associated with preamble sequences. Alternatively, the parameters are associated with time/frequency resources used to transmit a first signal of the random access procedure.

In one method, the signal includes a synchronization signal. The synchronization signal includes one or more of a primary synchronization signal or secondary synchronization signal. In another method, the signal includes a reference signal. The reference signal includes one or more of the following: cell-specific reference signal, MBSFN reference signal, UE-specific reference signal, positioning reference signal, CSI reference signal, discovery signal, and beam specific reference signal. In one method, the signal can be used to identify a transmitter of the signal, e.g., namely which network node transmitted the signal. In another method, the signal can be used to identify at least one beam (of a network node) used to transmit the signal. In yet another method, the signal indicates information related to the specific network node.

In the various above-reference methods, the UE indicates the information related to the specific network node via a first signal of the random access procedure, e.g. Msg1 in LTE. The information can include: an identity of the network node, an identity of at least one beam (of a network node), and/or at least an identity of at least one beam (of a UE).

The information can be indicated together with a random access preamble, e.g. Msg1, during the random access procedure. Alternatively, the information can be (implicitly) indicated via a preamble sequence selected by the UE. Alternatively, the information is (implicitly) indicated via a (time/frequency) resource used by the UE to transmit a preamble. In yet another method, the information is included in a first signal of the random access procedure, e.g. a message like Msg1 in LTE.

In another method, the UE transmits a first signal of the random access procedure in the cell and monitors at least a response of the first signal in the cell. The UE will utilize the response if the response is transmitted by the specific network node. The UE will not utilize the response if the response is not transmitted by the specific network node. The specific network node is determined by the UE based on the measurement means that the UE selects a network node with qualified measured result from the measurement. Alternatively, the specific network node is determined by the UE based on the measurement means that the UE selects a network node with best measured result from the measurement.

In the various above-reference methods, the UE initiates the random access procedure after the UE determines the specific network node. Alternatively, the UE initiates the random access procedure before the UE determines the specific network node.

In one method, the network node receives a first signal of a random access procedure from a UE. The network node then derives a destination of the first signal. The network node transmits a second signal of the random access procedure to the UE to respond to the first signal if the destination is the network node. The destination can be a network node identity. In another step of the method, the network node does not respond to the first signal if the destination is not the network node. In another method, the network node can derive the destination based on a preamble sequence of the first signal. Alternatively, the network node can derive the destination by a (time/frequency) resource used by the first signal. In yet another method, the network node can derive the destination by decoding the first signal.

In another method, the network node receives a first signal of a random access procedure from a UE. The network node transmits a second signal of the random access procedure to the UE to respond to the first signal, wherein the second signal indicates information of the network node. The information includes an identity of the network and/or an identity of at least one beam (of the network node). The information can be calculated in a sequence such as RA-RNTI.

In another method, a UE performs a random access procedure to communicate with a cell. The UE transmits a first signal of the random access procedure in the cell. The UE monitors at least a response of the first signal in the cell. The UE then determines whether to utilize the response based on received signal quality of the response. In one method, the UE utilizes the response if the signal quality is larger than or equal to a threshold. Alternatively, the UE utilizes the response if the signal quality is the best among all of the received responses during a period of time. In another method, the UE utilizes the response if the signal quality is qualified. In some methods, the response is a message like Msg2 of the random access procedure in LTE. In the above-disclosed methods, "monitoring" means receiving the response of the first signal (for a period of time). In other methods, after the UE determines to utilize the response, the UE can stop monitoring. Alternatively, after the UE determines to utilize the response, the UE can continue monitoring another response. In the above-disclose methods, "utilizing the response" means to apply information included in the response, e.g. RA-preamble identifier, Timing Alignment information, initial UL grant, or Temporary C-RNTI. The signal quality can be related to the strength of the signal, (e.g., received power), channel quality, and/or the number of qualified beams of the network node.

According to another method, a UE performs a first attempt of a random access procedure to communicate with a first network node of a cell. The UE performs a second attempt of the random access procedure to communicate with a second network node of the cell when the first attempt fails, wherein the first network node is changed to the second network node based on a measurement. In one method, the second network node is selected based on the measurement. In another method, the first UE network node is changed to the second network node when a number of failure attempts of the random access procedure is larger than or equal to a threshold.

In other methods, if the first network node is changed to the second network node, a counter for a number of failure attempts is reset. Alternatively, if the first network node is changed to the second network node, a counter for a number of failure attempts is not reset. In one method, if the first network node is changed to the second UE network node, a counter used to count the number of network node changes during the random access procedure is increased.

In one method, if the first network node is changed to the second network node, transmission power used for the random access procedure is reset. Alternatively, if the first network node is changed to the second network node, transmission power used for the random access procedure is not reset.

In one method, if the first network node is changed to the second UE network node, buffered data to be transmitted via a third signal of the random access procedure is kept or not flushed.

According to another method, a UE performs a random access procedure to communicate with a cell. The UE then transmits a signal of the random access procedure via at least a UE beam, wherein the signal indicates information of the UE beam. In one method, the signal is a first signal. Alternatively, the signal is a third signal. In other methods, the information is an identity related to at least a UE beam of the UE.

According to one method, a network node receives a signal of a random access procedure from a UE, wherein the signal indicates information of at least a UE beam of the UE. The network node transmits another signal to the UE to indicate the information. In one method, the "signal" is a first signal. Alternatively, the "signal" is a third signal. In one method, the "another signal" is a second signal like Msg2 of the random access procedure in LTE. In one method, the "another signal" is a forth signal like Msg4 of the random access procedure in LTE. In some methods, the "another signal" is always transmitted after the "signal." In some embodiments, the information is an identity related to at least a beam of the UE.

According to one method, a network node of a cell transmits a signal to a UE to trigger a random access procedure to communicate with another network node of another cell comprising multiple network nodes, wherein the signal comprises information of the another network node. In one method, the signal is a message like Msg0 of the random access procedure in LTE. The signal can be transmitted via HO command. The signal can be transmitted via PDCCH. In one method, the signal includes a non-contention random access preamble.

The various methods disclosed herein, the measurement measures the strength of the signal, e.g., received power. The measurement can be used to measure channel quality between the UE and the network node. The measurement can be used to measure the number of qualified beams of the network node.

In the various methods, the qualified beam (or the qualified network node) means that strength of the signal is larger than or equal to a threshold. Alternatively, the qualified beam (or the qualified network node) means that the channel quality is larger than or equal to a threshold. Alternatively, the qualified network node means that a number of qualified beams of the network node is larger than a threshold.

In the various methods, the first signal can be a signaling carrying part or all content of Msg1 in LTE. In the various methods, the second signal can be a signaling carrying part of all content of Msg2 in LTE. In the various methods, the third signal is similar to Msg3 of the random access procedure in LTE.

In the various methods, the information is an identity. The information is provided explicitly or provided implicitly (e.g., derived from other information).

In the various methods, the measurement can be performed with or without UE beamforming. In the various methods, the UE performs the measurement by at least measuring a synchronization signal of a cell. Alternatively, the UE performs the measurement by at least measuring a reference signal of a cell. Alternatively, the UE performs the measurement by at least measuring a discovery signal of a cell.

In the various methods, the random access procedure can be contention-based. Alternatively, the random access procedure can be non-contention based (i.e. contention free). In the various methods, the random access procedure is initiated by the network node. Alternatively, the random access procedure is initiated by the UE. In the various methods, the downlink and uplink are reciprocal. Alternatively, downlink and uplink are not reciprocal.

In the various methods, the cell is a serving cell of the UE, and the "another cell" is a neighbor cell of the UE. In the various methods, the cell includes one network node. Alternatively, the cell includes multiple network nodes.

In the various methods, the network node can be a central unit (CU), a distributed unit (DU), a transmission/reception point (TRP), a base station (BS), or a 5G node. In other methods, the network node is associated with a cell including multiple network nodes.

In the various methods, the UE beam is for transmission. Alternatively, the UE beam is for reception. In various methods, the UE is capable of using UE beamforming. In various methods, the UE does not use UE beamforming if the cell doesn't support (or allow) UE beamforming.

In the various methods, the UE can use beam sweeping for transmission or reception. Alternatively, the UE does not use beam sweeping for transmission or reception.

In the various methods, the UE is in non-connected state. In other methods, the UE is in an idle state. In other methods, the UE is in an inactive state. In other methods, the UE is in a state where the UE has no RRC connection. In yet another method, the UE is in a state where the UE has no connection to a core network. In other methods, the UE is in a state where the UE has no use data traffic for a period of time. In other methods, the UE is in a state where the UE mobility is loosely tracked by a network. In other methods, the UE is in connected state (or connected mode).

Referring back to FIGS. 3 and 4, in one embodiment, the device 300 includes a program code 312 stored in memory 310. The CPU 308 could execute program code 312 to enable the UE (i) to perform a first attempt of a random access procedure to communicate with a cell via at least a first UE beam; and (ii) to perform a second attempt of the random access procedure to communicate with the cell via at least a second UE beam when the first attempt fails, wherein the direction of the first UE beam and the direction of the second UE beam are different.

In another embodiment, the CPU 308 could execute program code 312 to enable the network (i) to form a cell comprising at least a first network node and a second network node; and (ii) to allocate resources for random access procedure, wherein the resources associated with the first network node is different from the second network node.

In another embodiment, the CPU 308 could further execute program code 312 to enable the UE to (i) perform a measurement to measure a signal in a cell, wherein the cell comprises multiple network nodes broadcasting the signal;

and (ii) perform a random access procedure to communicate with a specific network node of the multiple network nodes, wherein the specific network node is determined by the UE based on the measurement.

In another embodiment, the CPU 308 could further execute program code 312 to enable the network node (i) to receive a first signal of a random access procedure from a UE; (ii) to derive a destination of the first signal; and (iii) to transmit a second signal of the random access procedure to the UE to respond to the first signal if the destination is the network node.

In another embodiment, the CPU 308 could further execute program code 312 to enable the network node (i) to receive a first signal of a random access procedure from a UE; and (ii) to transmit a second signal of the random access procedure to the UE to respond to the first signal, wherein the second signal indicates information of the network node.

In another embodiment, the CPU 308 could further execute program code 312 to enable the UE (i) to perform a random access procedure to communicate with a cell; and (ii) to transmit a first signal of the random access procedure in the cell; and (iii) to monitor at least a response of the first signal in the cell; and (iv) to determine whether to utilize the response based on received signal quality of the response.

In another embodiment, the CPU 308 could further execute program code 312 to enable the UE (i) to perform a first attempt of a random access procedure to communicate with a first network node of a cell; and (ii) to perform a second attempt of the random access procedure to communicate with a second network node of the cell when the first attempt fails, wherein the first network node is changed to the second network node based on a measurement.

In another embodiment, the CPU 308 could further execute program code 312 to enable the UE (i) to perform a random access procedure to communicate with a cell; and (ii) to transmit a signal of the random access procedure via at least a UE beam, wherein the signal indicates information of the UE beam.

In another embodiment, the CPU 308 could further execute program code 312 to enable a network node (i) to receive a signal of a random access procedure from a UE, wherein the signal indicates information of at least a UE beam of the UE; and (ii) to transmit another signal to the UE to indicate the information of the UE beam.

Furthermore, the CPU 308 can execute the program code 312 to perform all of the above-described actions and steps or others methods described herein.

Based on the invention, random access procedure is optimized, e.g. to reduce power consumption, delay, signaling overhead, waste of resources, and/or contention, and UE beamforming can be used more efficiently during random access procedure.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of user equipment (UE) for random access procedure, the method comprising:
performing a first attempt of a random access procedure to communicate with a cell via at least a first UE beam;
performing measurement of signals broadcasted by a Transmission/Reception Point (TRP) of the cell to determine whether to update the first UE beam to a second UE beam when the first attempt fails; and
performing a second attempt of the random access procedure to communicate with the cell via at least the first UE beam or via at least the second UE beam based on the measurement when the first attempt fails, wherein the direction of the first UE beam and the direction of the second UE beam are different and whether to do backoff and increase transmission power for the second attempt depends on whether the second attempt is via at least the first UE beam or via at least the second UE beam.

2. The method of claim 1, further comprising:
determining whether to update a TRP beam based on the measurement when the first attempt fails.

3. The method of claim 1, wherein the first UE beam is changed to the second UE beam when a number of failure attempts of the random access procedure is larger than or equal to a threshold.

4. The method of claim 1, wherein the UE performs the first attempt via at least the first UE beam and via at least a first TRP beam of the cell.

5. The method of claim 1, wherein if the first UE beam is changed to the second UE beam, a counter for a number of failure attempts is not reset.

6. The method of claim 4, wherein the UE performs the second attempt via at least the first TRP beam or via at least a second TRP beam of the cell based on the measurement.

7. The method of claim 1, wherein if the first UE beam is changed to the second UE beam, transmission power used for the random access procedure is not reset.

8. The method of claim 1, wherein the first attempt includes transmitting a first random access preamble via at least the first UE beam and the second attempt includes transmitting a second random access preamble via at least the first UE beam or via at least the second UE beam.

9. The method of claim 1, wherein the first attempt fails if an associated random access response is not received during a first period of time or a contention resolution cannot be received during a second period of time.

10. The method of claim 1, wherein the first UE beam is changed to the second UE beam based on the measurement.

11. A User Equipment (UE) for random access procedure, comprising:
a control circuit;
a processor installed in the control circuit;
a memory installed in the control circuit and coupled to the processor;
wherein the processor is configured to execute a program code stored in the memory to:
perform a first attempt of a random access procedure to communicate with a cell via at least a first UE beam;
perform measurement of signals broadcasted by a Transmission/Reception Point (TRP) of the cell to determine whether to update the first UE beam to a second UE beam when the first attempt fails; and
perform a second attempt of the random access procedure to communicate with the cell via at least the first UE beam or via at least the second UE beam based on the measurement when the first attempt fails, wherein the direction of the first UE beam and the direction of the second UE beam are different and whether to do backoff and increase transmission power for the second attempt depends on whether the second attempt is via at least the first UE beam or via at least the second UE beam.

12. The UE of claim 11, further comprising:
determine whether to update a TRP beam based on the measurement when the first attempt fails.

13. The UE of claim 11, wherein the first UE beam is changed to the second UE beam when a number of failure attempts of the random access procedure is larger than or equal to a threshold.

14. The UE of claim 11, wherein the UE performs the first attempt via at least the first UE beam and via at least a first TRP beam of the cell.

15. The UE of claim 11, wherein if the first UE beam is changed to the second UE beam, a counter for a number of failure attempts is not reset.

16. The UE of claim 14, wherein the UE performs the second attempt via at least the first TRP beam or via at least a second TRP beam of the cell based on the measurement.

17. The UE of claim 11, wherein if the first UE beam is changed to the second UE beam, transmission power used for the random access procedure is not reset.

18. The UE of claim 11, wherein the first attempt includes transmitting a first random access preamble via at least the first UE beam and the second attempt includes transmitting a second random access preamble via at least the first UE beam or via least the second UE beam.

19. The UE of claim 11, wherein the first attempt fails if an associated random access response is not received during a first period of time or a contention resolution cannot be received during a second period of time.

20. The UE of claim 11, wherein the first UE beam is changed to the second UE beam based on the measurement.

\* \* \* \* \*